US009473699B2

(12) United States Patent
Suzuki et al.

(10) Patent No.: US 9,473,699 B2
(45) Date of Patent: Oct. 18, 2016

(54) STORAGE MEDIUM STORING INFORMATION PROCESSING PROGRAM, INFORMATION PROCESSING DEVICE, INFORMATION PROCESSING SYSTEM, AND INFORMATION PROCESSING METHOD

(71) Applicants: Toshiaki Suzuki, Kyoto (JP); Takuya Abe, Tokyo (JP)

(72) Inventors: Toshiaki Suzuki, Kyoto (JP); Takuya Abe, Tokyo (JP)

(73) Assignees: Nintendo Co., Ltd., Kyoto (JP); Hal Laboratory, Inc., Tokyo (JP)

( * ) Notice: Subject to any disclaimer, the term of this patent is extended or adjusted under 35 U.S.C. 154(b) by 556 days.

(21) Appl. No.: 13/864,681

(22) Filed: Apr. 17, 2013

(65) Prior Publication Data
US 2013/0321568 A1 Dec. 5, 2013

(30) Foreign Application Priority Data

Jun. 1, 2012 (JP) ................................. 2012-125798

(51) Int. Cl.
*H04N 5/232* (2006.01)
(52) U.S. Cl.
CPC ................................. *H04N 5/23238* (2013.01)
(58) Field of Classification Search
CPC ................................................. H04N 5/23238
USPC ................................ 348/36, 38, 39; 345/672
See application file for complete search history.

(56) References Cited

U.S. PATENT DOCUMENTS

| 7,002,617 B1* | 2/2006 | Smith | G08B 13/19628 340/692 |
|---|---|---|---|
| 8,836,783 B2* | 9/2014 | Rondinelli | H04N 5/23238 348/143 |
| 2001/0010555 A1* | 8/2001 | Driscoll, Jr. | G02B 13/06 348/335 |
| 2002/0075295 A1* | 6/2002 | Stentz | G09G 5/00 715/727 |
| 2004/0125044 A1 | 7/2004 | Suzuki | |
| 2010/0321512 A1* | 12/2010 | Chevallier | G03B 37/04 348/222.1 |
| 2012/0218377 A1* | 8/2012 | Oku | H04N 5/23238 348/36 |
| 2012/0306933 A1* | 12/2012 | Osako | A63F 13/10 345/672 |

FOREIGN PATENT DOCUMENTS

| JP | 2004-241834 | 8/2004 |
|---|---|---|
| JP | 2005-99064 | 4/2005 |
| JP | 2012-119803 | 6/2012 |

* cited by examiner

*Primary Examiner* — Brian Yenke
*Assistant Examiner* — Jean W Desir
(74) *Attorney, Agent, or Firm* — Nixon & Vanderhye PC

(57) ABSTRACT

From a panorama moving image storage unit storing a panorama moving image, a panorama moving image is read and sequentially acquired. A display range, of the acquired panorama moving image, which is to be displayed on a display device is set in accordance with an operation made by a user. A sound to be output in synchronization with display of the image on the display device is generated based on the display range. Control of sequentially displaying the display range of the acquired panorama moving image on the display device is performed. Control of outputting the generated sound from the speaker in synchronization with the display of the image on the display device is performed.

22 Claims, 12 Drawing Sheets

F I G. 1
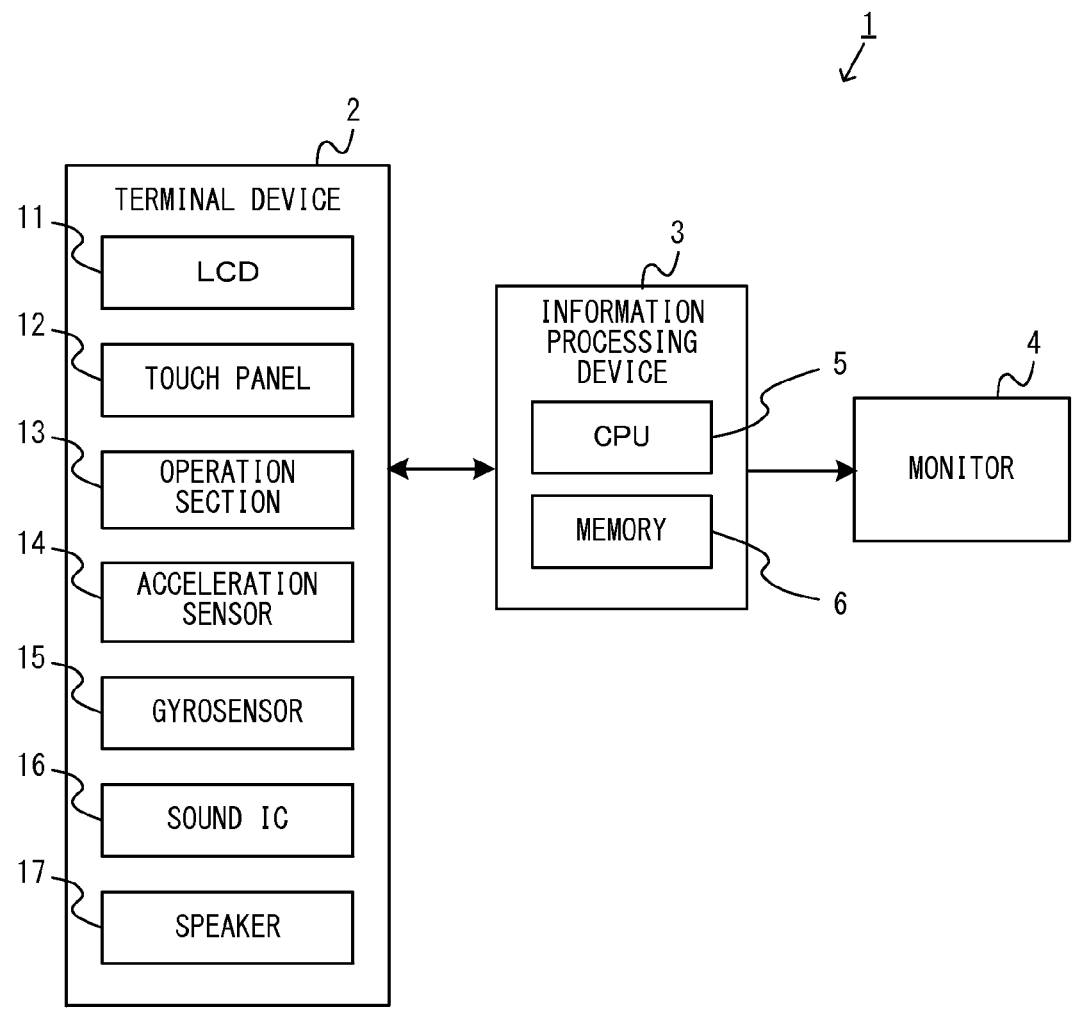

FIG. 13

| FRAME NO. | PANORAMA IMAGE DATA | SOUND DATA | | | |
|---|---|---|---|---|---|
| | | MICROPHONE POSITION INFORMATION | SOUND COLLECTION DATA | MICROPHONE POSITION INFORMATION | SOUND COLLECTION DATA |
| 1 | I1 | Am11 | Sm11 | Am21 | Sm21 |
| 2 | I2 | Am12 | Sm12 | Am22 | Sm22 |
| 3 | I3 | Am13 | Sm13 | Am23 | Sm23 |
| ... | ... | ... | ... | ... | ... |
| n | In | Am1n | Sm1n | Am2n | Sm2n |

Da

STORAGE MEDIUM STORING INFORMATION PROCESSING PROGRAM, INFORMATION PROCESSING DEVICE, INFORMATION PROCESSING SYSTEM, AND INFORMATION PROCESSING METHOD

CROSS REFERENCE TO RELATED APPLICATION

The disclosure of Japanese Patent Application No. 2012-125798 filed on Jun. 1, 2012 is incorporated herein by reference.

FIELD

The technology described herein relates to a storage medium storing an information processing program, an information processing device, an information processing system, and an information processing method; and specifically to a storage medium storing an information processing program, an information processing device, an information processing system, and an information processing method for, for example, displaying a panorama moving image.

BACKGROUND AND SUMMARY

Conventionally, there is a moving image generation device for displaying a part of a panorama moving image on a display device and outputting a sound when displaying the panorama moving image.

However, the above-described moving image generation device outputs the same sound regardless of which part of the panorama moving image is displayed, and therefore does not easily give a viewer a sense of being at the site of the image when displaying the panorama moving image.

Accordingly, an object of the example embodiment is to provide a storage medium storing an information processing program, an information processing device, an information processing system, and an information processing method capable of, when displaying a panorama moving image, giving a viewer an enhanced sense of being at the site of the image.

In order to achieve the above object, the example embodiment may adopt, for example, the following structures. It is understood that for interpreting the recitations of the claims, the range thereof is to be interpreted only based on the recitations of the claims, and that in the case where the recitations of the claims are contradictory to the description of the specification, the recitations of the claims are given priority.

An exemplary configuration of a non-transitory computer-readable storage medium according to the exemplary embodiment stores an information processing program which is executable by a computer included in an information processing device for displaying an image on at least one first display device including a speaker. The information processing program allows the computer to execute reading and sequentially acquiring a panorama moving image from a panorama moving image storage unit storing a panorama moving image; setting a display range, of the acquired panorama moving image, which is to be displayed on the first display device in accordance with an operation made by a user; generating, based on the display range, a sound to be output in synchronization with display of the image on the first display device; performing control of sequentially displaying the display range of the acquired panorama moving image on the first display device; and performing control of outputting the generated sound from the speaker in synchronization with the display of the image on the first display device.

The "information processing device" described above may be formed of a device different from the first display device. Alternatively, in the case where the first display device has an information processing function, the "information processing device" may be formed of the first display device. In the former case, the "different device" may execute each process of the example embodiment, whereas the first display device may merely display an image generated by the "different device". Alternatively, in the case where the first display device has an information processing function, each process of the example embodiment may be realized by a cooperation of the information processing function of the first display device and the information processing function of the "different device". The "different device" may be formed of a plurality of information processing devices, and execution of each process of the example embodiment may be divided among the plurality of information processing devices. The "information processing device" may be a game device provided as an example in the example described later or a multi-purpose information processing device such as a general personal computer.

In an example, the first display device is a portable display device. In another example, the first display device is a non-portable display device. In these cases, the first display device is a display device connected to the information processing device in a wireless or wired manner, such as a terminal device 2 or a monitor 4 in the example described later. The first display device may be any device capable of displaying an image generated by the information processing device. For example, the first display device may be integrated with the information processing device (accommodated in the same housing with the information processing device).

The "panorama moving image" described above may have an angle of field which is equal to or greater larger than 180° in one of an up-down direction and a left-right direction. Further, the "panorama moving image" may have an angle of field of 360° in one of the directions. In the other direction, the "panorama moving image" may have an angle of field which is equal to or greater than that of the moving image to be displayed on the first display device. Further, the "panorama moving image" may have an angle of field which is equal to or greater than twice the angle of field of the moving image, equal to or greater than 120°, equal to or greater than 150°, or 180°.

The "panorama moving image storage unit" may store a moving image captured by a panorama moving image capturing function of the information processing device, or may store a moving image captured by another device having the moving image capturing function and transmitted thereto via a prescribed storage medium or a network.

According to the above, the sound to be output from the speaker is adjusted in accordance with the display range of the panorama moving image displayed on the first display device. Therefore, when the panorama moving image is displayed, an enhanced sense of being at the site of the image can be provided.

The information processing program may allow the computer to further execute acquiring an original sound for generating the sound to be output in synchronization with the display of the image on the first display device, the original sound being acquired from a sound storage unit storing at least one sound recorded at the time of capturing the panorama moving image or at the time of reproducing the panorama moving image. In this case, a volume of the acquired original sound may be adjusted based on the display range to generate the sound to be output in synchronization with the display of the image on the first display device.

According to the above, the sound to be output when the panorama moving image is displayed can be generated by use of the sound recorded at the time of capturing the panorama moving image or at the time of reproducing the panorama moving image.

The sound storage unit may store a position in the panorama moving image which is a sound source of the recorded sound, the position being stored in correspondence with each or the at least one sound. Based on the position of the sound source with respect to the display range of the panorama moving image, the volume of the sound having the position as the sound source may be adjusted.

According to the above, the localization at the time of outputting the sound recorded at the time of capturing the panorama moving image or at the time of reproducing the panorama moving image can be adjusted in accordance with the panorama moving image to be displayed.

In the case where the display range of the panorama moving image and the position of the sound source are relatively close to each other, the volume of the sound having the position as the sound source may be adjusted to be relatively large.

According to the above, the sound at the sound source within, or close to, the display range on the first display device can be output with priority. Therefore, when the panorama moving image is displayed, an enhanced sense of being at the site of the image can be provided.

In the case where the position of the sound source is within a prescribed range with respect to the display range of the panorama moving image, the volume of the sound having the position as the sound source may be set to a value equal to or greater than a prescribed value, and in the case where the position of the sound source is outside the prescribed range, the volume of the sound having the position as the sound source may be set to 0.

According to the above, the sound output can be controlled such that the sound at the sound source is turned ON or OFF in accordance with whether or not the sound source is in the prescribed display range with respect to the display range.

The sound storage unit may store sounds respectively recorded at a plurality of sound sources at the time of capturing the panorama moving image or at the time of reproducing the panorama moving image, and may store a position, in the panorama moving image, of each of the sound sources, the position being stored in correspondence with each of the sounds. The sound to be output in synchronization with the display of the image on the first display device may be selected based on the position of each of the sound sources with respect to the display range of the panorama moving image.

According to the above, the sound to be output can be selected by changing the display range of the panorama moving image.

In the case where the display range of the panorama moving image and the position of each of the sound sources are put into a prescribed relationship, the sound having the position as the sound source may be selected as the sound to be output in synchronization with the display of the image on the first display device.

According to the above, the sound to be output can be selected by moving the display range of the panorama moving image.

The volume of the sound having the position as the sound source may be adjusted in accordance with whether the display range of the panorama moving image encompasses the position of the sound source or not.

According to the above, only the sound at the sound source which is within the display range of the panorama moving image can be output.

In the case where the display range of the panorama moving image encompasses the position of the sound source, the volume of the sound having the position as the sound source may be adjusted to be relatively large.

According to the above, the sound at the sound source within the display range displayed on the first display device can be output with an increased volume. Therefore, when the panorama moving image is displayed, an enhanced sense of being at the site of the image can be provided.

As the position of the sound source in the panorama moving image, the sound storage unit may store an effective area in which the sound having the position as the sound source is an output target, the effective area being stored as being set in the panorama moving image and in correspondence with each sound source. The volume of the sound at the sound source for which the effective area is set may be adjusted in accordance with the size of the effective area encompassed in the display range of the panorama moving image.

According to the above, the sound output can be controlled in accordance with the ratio of the effective area of each sound source with respect to the display range of the panorama moving image.

The first display device may be capable of displaying the panorama moving image as being enlarged or reduced in accordance with an operation made by the user. The display range to be displayed on the first display device may be set as being enlarged or reduced in accordance with an operation of enlarging or reducing the panorama moving image. The volume of the sound may be adjusted in accordance with the enlarged or reduced display range.

According to the above, the sound output can be controlled in accordance with the enlargement or the reduction of the moving image displayed on the first display device.

The panorama moving image storage unit may store a panorama moving image of a real world. The sound storage unit may store sounds which are recorded at the time of capturing the panorama moving image by use of a plurality of directional microphones having different sound collection directions in the real world, and may store a position corresponding to each of the sound collection directions in the panorama moving image as the position of the sound source, the position being stored in correspondence with each of the sounds. The volume of the sound having the position as the sound source may be adjusted based on the position of the sound source with respect to the display range of the panorama moving image.

According to the above, the sound to be output when the panorama moving image is displayed can be generated by use of the sounds recorded by the plurality of directional microphones.

The panorama moving image storage unit may store a panorama moving image of a real world. The sound storage unit may store sounds which are recorded at the time of capturing the panorama moving image by use of microphones respectively provided at a plurality of sound collection positions in the real world, and may store each of the sound collection positions in the panorama moving image as the position of the sound source, the position being stored in correspondence with each of the sounds. The volume of the sound having the position as the sound source may be adjusted based on the position of the sound source with respect to the display range of the panorama moving image.

According to the above, the sound to be output when the panorama moving image is displayed can be generated by use of the sounds recorded by the microphones respectively provided at the plurality of sound collection positions.

The sound storage unit may store at least a sound recorded at the time of capturing the panorama moving image, and may store a position in the panorama moving image specified at the time of the recording as the position of the sound source, the position being stored in correspondence with each of the sounds. The volume of the sound having the position as the sound source may be adjusted based on the position of the sound source with respect to the display range of the panorama moving image.

According to the above, the sound to be output when the panorama moving image is displayed can be generated by use of the sound added at the time of reproducing the panorama moving image.

The information processing program may allow the computer to further execute locating the acquired panorama moving image in a virtual space. In this case, a line-of-sight direction toward the panorama moving image located in the virtual space may be changed to set the display range of the panorama moving image.

According to the above, the sound output control can be performed in accordance with the direction in which the panorama moving image is displayed.

The information processing program may allow the computer to further execute receiving an input from an input device associated to the first display device. In this case, the display range may be set based on the input received from the input device associated to the first display device.

According to the above, the display range of the panorama moving image can be changed, and the sound to be output from the first display device can also be changed, by use of the input device associated to the first display device.

The first display device may include a sensor for outputting data in accordance with a movement or an attitude of a main body of the first display device. The data output from the sensor may be received as an input from the input device. The display range may be set in accordance with the attitude of the first input device, which is calculated based on the data output from the sensor.

Typically, the "setting of the display range" described above is moving the range to be displayed on the first display device in accordance with the change of the attitude of the first display device, at least in the same direction as that of the change of the attitude. Alternatively, the "setting of the display range" is making the amount of movement larger as the amount of change of attitude of the first display device is larger. Still alternatively, the "setting of the display range" is matching the amount of change of the attitude of the first display device to the amount of change of the attitude of the virtual camera for generating the range of the moving image. The "setting of the display range" may be controlling the change of the current attitude from the reference attitude of the virtual camera in accordance with the change of the current attitude from the reference attitude of the first display device. Alternatively, the "setting of the display range" may be controlling the change of the current attitude from the immediately previous attitude of the virtual camera in accordance with the change of the current attitude from the immediately previous attitude of the first display device. The "attitude" may be set two-dimensionally or three-dimensionally.

According to the above, when the attitude of the first display device is changed, the display range of the panorama moving image in accordance with the change of the attitude is displayed and the sound in accordance with the display range is output. Therefore, an operation environment which makes the user feel as if he/she was looking at a space formed by the panorama moving image via the first display device can be provided.

The sensor may be at least one of a gyrosensor or an acceleration sensor for outputting the data in accordance with the movement or the attitude of the main body of the first display device. The display range may be set in accordance with the attitude of the first display device, which is calculated based on the data output from at least one of the gyrosensor and the acceleration sensor.

According to the above, the attitude of the main body of the first display device can be easily calculated by use of angular velocity data obtained from the gyrosensor or acceleration data obtained by the acceleration sensor.

A display range which is to be displayed on a non-portable second display device may be further set in the acquired panorama moving image. A sound to be output from the second display device in synchronization with display of an image on the second display device may be further generated independently from the sound generated based on the display range displayed on the first display device. Control of sequentially displaying, on the second display device, the display range of the acquired panorama moving image which is to be displayed on the second display device may be further performed. Control of outputting the sound to be output from the second display device, from the second display device in synchronization with the display of the image on the second display device may be further performed.

According to the above, the sound independent from the sound controlled in accordance with the display range to be displayed on the first display device can be output from the non-portable display device.

The panorama image which forms each frame of the panorama moving image may be read and sequentially acquired from the panorama moving image storage unit at a cycle of a predetermined time length for which reproduction is performed on the first display device. The display range of the acquired panorama moving image may be set. The sound to be output in synchronization with the display of the panorama image on the first display device may be generated based on the display range. Control of sequentially displaying the display range of the acquired panorama image on the first display device may be performed. Control of outputting the generated sound from the speaker in synchronization with the display of the panorama image on the first display device may be performed.

The example embodiment may be implemented in the form of an information processing device or an information processing system each including units for performing the operations described above, or in the form of an information processing method including the operations described above.

According to the example embodiment, the sound to be output from the speaker is adjusted in accordance with the display range of the panorama moving image to be displayed on the display device. Therefore, when the panorama moving image is displayed, an enhanced sense of being at the site of the image can be provided.

These and other objects, features, aspects and advantages of the example embodiment will become more apparent from the following detailed description when taken in conjunction with the accompanying drawings.

BRIEF DESCRIPTION OF THE DRAWINGS

FIG. 1 is a block diagram showing a non-limiting example of information processing system 1;

FIG. 13 shows a non-limiting example of panorama image file data Da stored on the memory 6;

DETAILED DESCRIPTION OF NON-LIMITING EXAMPLE EMBODIMENTS

[Structure of Information Processing System]

Figure 2:
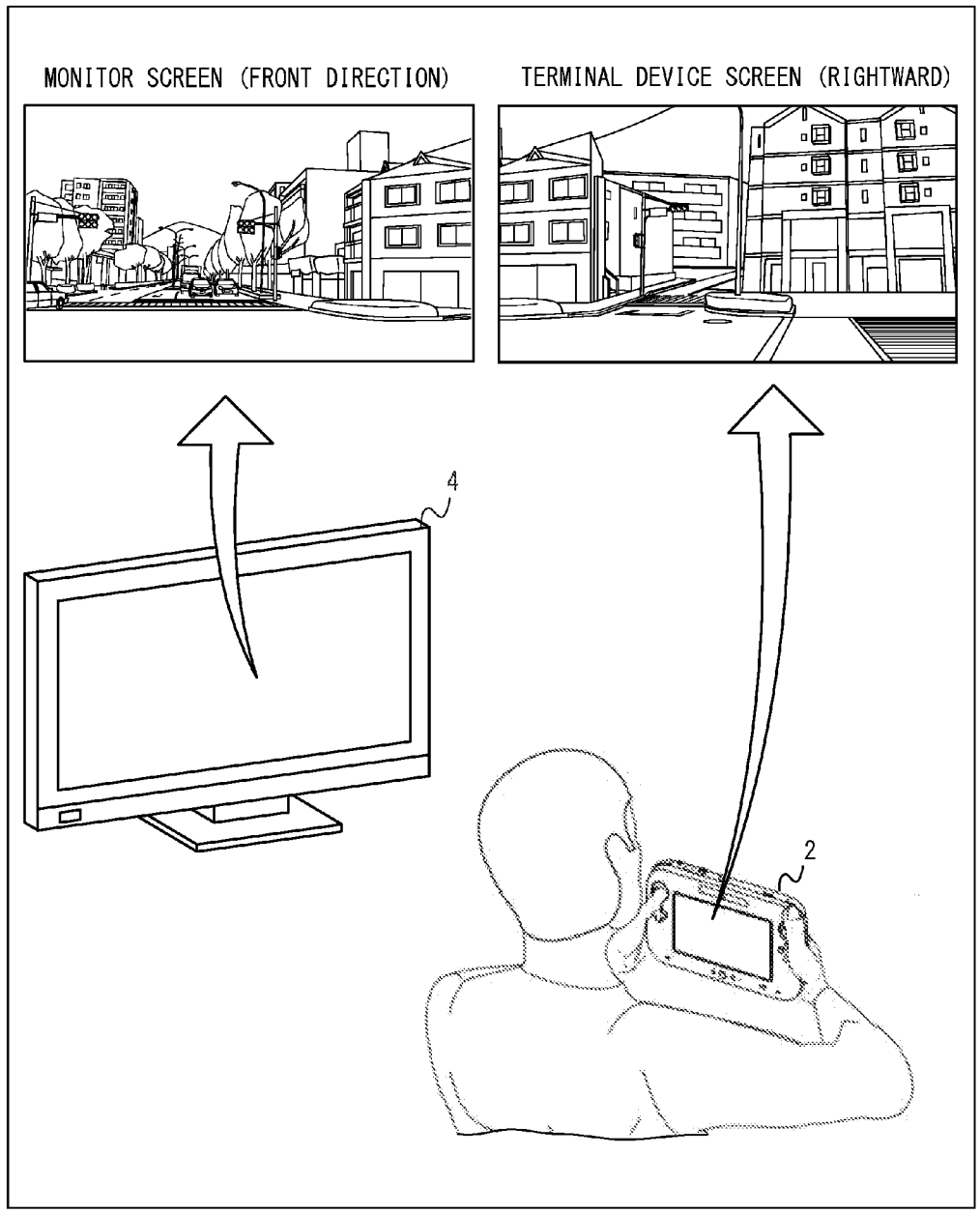
FIG. 2 shows a non-limiting example of panorama moving images (images) displayed by the information processing system 1.

With reference to FIG. 1, an information processing device for executing an information processing program according to one example and an information processing system including the information processing device will be described. FIG. 1 is a block diagram showing an example of an information processing system 1 including a non-portable information processing device 3. In an example, the information processing device 3 is formed of a non-portable game device, and the information processing system 1 is formed of a game system including the game device.

As shown in FIG. 1, the information processing system 1 includes a terminal device 2, the information processing device 3, and a monitor 4. In the example embodiment, the information processing system 1 generates an image (panorama image) and displays the image on a display device (the terminal device 2 and/or the monitor 4).

In the information processing system 1, the information processing device 3 executes an information processing operation in accordance with an input made on the terminal device 2, and an image obtained as a result of the execution is displayed on the terminal device 2 and/or the monitor 4. As can be seen, in the example embodiment, the information processing system 1 realizes an input function, an information processing function and a display function by use of a plurality of devices. In other embodiments, the information processing system 1 may be formed of a single information processing device (e.g., mobile or portable information processing device) for realizing these functions.

The terminal device 2 is an input device which can be held (which can be transported) by a user. The terminal device 2 is communicable with the information processing device 3. The terminal device 2 transmits operation data representing an operation made on the terminal device 2 to the information processing device 3. In the example embodiment, the terminal device 2 includes a display section (LCD 11), a sound IC 16, and a speaker 11. The terminal device 2 is a display device and also is a sound output device. The speaker 17 includes, for example, a pair of stereo speakers, and an output thereof is controlled by the sound IC 16, which is a circuit for controlling an output of sound data. When an image is transmitted from the information processing device 3, the terminal device 2 displays the image on the LCD 11. When a sound is transmitted from the information processing device 3, the terminal device 2 outputs the sound through the speaker 17 via the sound IC 16. The sound IC 16 may output the sound through the speaker 17 in a state where a prescribed surround effect (e.g., pseudo surround) is added to the sound based on localization of the sound transmitted from the information processing device 3.

The terminal device 2 includes a touch panel 12 as an input section. The tough panel 12 is an example of position detection section for detecting a position, in a prescribed input plane (screen of the display section) provided in a housing, at which data has been input. The terminal device 2 also includes an operation section 13 such as a slide pad, a cross-shaped key, buttons or the like as an input section.

The terminal device 2 further includes an acceleration sensor 14 as an input section. The acceleration sensor 14 detects an acceleration in a prescribed axial direction (in the example embodiment, directions of three axes, but may be a direction of at least one axis) of the terminal device 2. The terminal device 2 also includes a gyrosensor 15 as an input section. The gyrosensor 15 detects an angular velocity of a rotation about a prescribed axial direction (in the example embodiment, directions of three axes, but may be a direction of at least one axis) of the terminal device 2. The acceleration sensor 14 and the gyrosensor 15 are sensors for detecting information usable for calculating an attitude of the terminal device 2 (information usable for calculating or estimating the attitude). In other embodiments, the attitude of the terminal device 2 may be calculated by any method, and may be calculated by use of a sensor other than the above-described sensors or by use of a camera capable of capturing an image of the terminal device 2.

The information processing device 3 executes various types of information processing operations executable by the information processing system 1 including, for example, a processing operation of generating an image or a sound. In the example embodiment, the information processing device 3 includes a CPU (control section) 5 and a memory 6. The CPU 5 executes a prescribed information processing program by use of the memory 6 to realize various functions of the information processing device 3. The information processing device 3 may have any structure as long as the above-described information processing operations can be executed. In the example embodiment, the information processing device 3 generates an image (panorama image) and a sound to be output when the image is displayed. The generated image and sound are output to the terminal device 2 and/or the monitor 4 which acts as both of a display device and a sound output device.

The monitor 4 is an example of device acting as both of a display device and a sound output device for displaying the generated image and outputting the generated sound. The monitor 4 is capable of receiving data transmitted from the information processing device 3. When the image and the sound generated by the information processing device 3 are transmitted to the monitor 4, the monitor 4 displays the image and outputs the sound.

[Reproduction of Panorama Moving Image]

Now, a processing operation of reproducing a panorama moving image executable by the information processing system 1 will be described. FIG. 2 shows an example of panorama moving image (image) displayed by the information processing system 1. As shown in FIG. 2, in the example embodiment, the panorama image is displayed on the terminal device 2 and the monitor 4. In other embodiments, a panorama image may be displayed on at least one display device.

Herein, a "panorama image" is an image having a wider viewing angle than that of an image displayed on a display device. Namely, the panorama image basically has a part thereof displayed on the display device (however, in the case where a plurality of display devices are used as in the example embodiment, the entirety of a panorama image may be displayed on at least one of such display devices). A panorama image may be explained as an image, the line-of-sight direction of which is changed when a display range thereof is changed. In the example embodiment, a panorama image having an omnidirectional (360°) viewing angle in an up-down direction and a left-right direction is used (see FIG. 3). However, a panorama image may have a dead angle, and may have a viewing angle of, for example, about 180°. In the example embodiment, a panorama image is an actual image captured by a camera (image of an actual object). Alternatively, a panorama image may be partially or entirely a virtual image (CG image).

In the example embodiment, as the reproduction of a panorama moving image proceeds, panorama images, each of which is a frame of the stored panorama moving image, are read at a cycle of a predetermined time length and sequentially displayed on the display device (the terminal device 2 and the monitor 4). Namely, the panorama images are sequentially displayed on the display device to reproduce the panorama moving image. Specifically, the plurality of panorama images included in the panorama moving image are each assigned a frame number, and the panorama images are reproduced in the order of the frame number. In an example, in the case where a panorama moving image which is captured while the point of view is moved in a predetermined space (e.g., real world) as the time passes is displayed, the point of view of the panorama moving image is moved as the time passes during the reproduction. For example, as shown in FIG. 2, a panorama image of an environment as seen from a position on a street is displayed, and a panorama moving image proceeding on the street (panorama moving image, the point of view of which moves along the street) is reproduced. In another example, in the case where a panorama moving image which is captured while the point of view is not moved in a predetermined space (i.e., panorama moving image which is obtained by fixed-point image capturing) is displayed, the state of environment around the point of view is changed as the time passes during the reproduction.

As shown in FIG. 2, each display device (each of the terminal device 2 and the monitor 4) displays a partial range of the panorama image. Hereinafter, a range of the panorama image which is displayed on a display device will be referred to as a "display range". In FIG. 2, in a display range of a panorama image displayed on the monitor 4, the line-of-sight direction of the panorama image is the proceeding direction of the point of view at which the panorama image is captured (front direction). In the example embodiment, the display range of the monitor 4 is basically fixed to a predefined range. Alternatively, the position or the size of the display range of the panorama image may be changed in accordance with an operation performed by the user.

A display range displayed on the terminal device 2 is changed in accordance with the attitude of the terminal device 2. For example, in FIG. 2, the attitude of the terminal device 2 is directed rightward with respect to the front direction (direction from the user (terminal device 2) toward the monitor 4). The display range of the panorama image displayed on the terminal device 2 is obtained when the line-of-sight is directed rightward with respect to the proceeding direction. In this manner, the information processing system 1 determines the display range of the panorama moving image to be displayed on the display device, based on an input made on the input device (terminal device 2). Owing to this, the user can freely change the line-of-sight direction (display range) by making an operation on the terminal device 2 (operation of changing the attitude) while viewing the panorama moving image. In other embodiments, the display range may be determined by any method as long as being changed in accordance with an operation made by the user.

Figure 3:
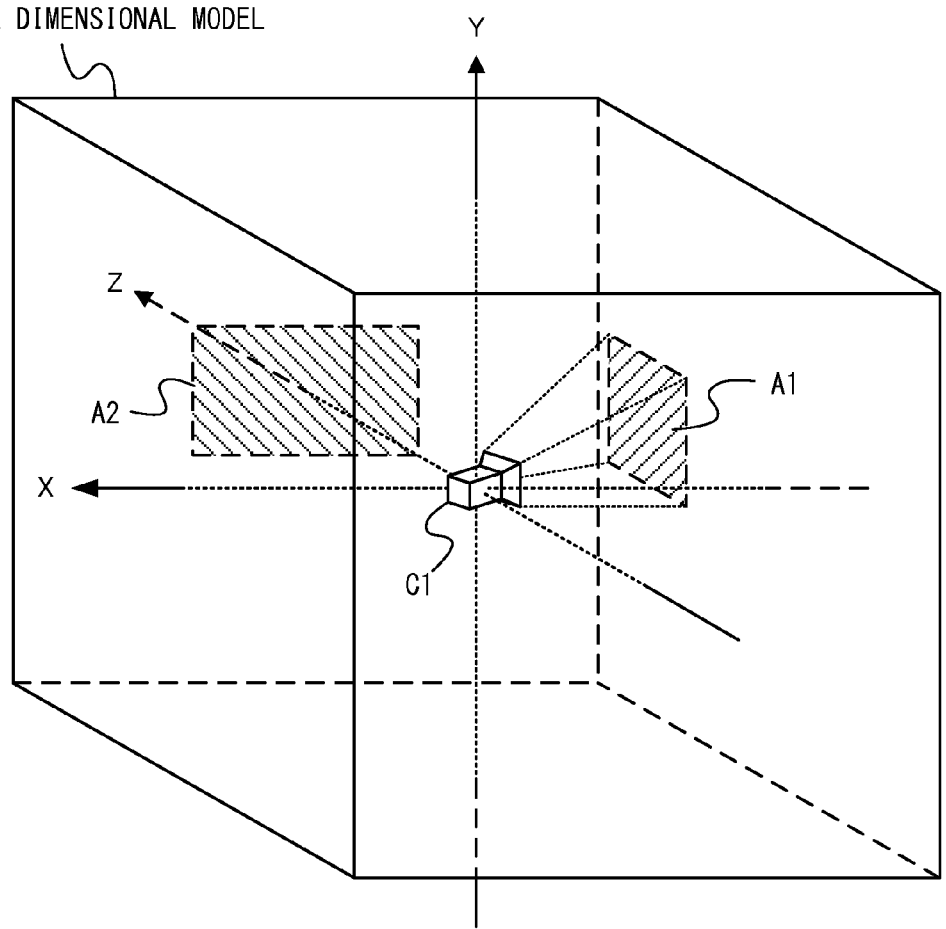
FIG. 3 shows a non-limiting example of method for determining a display range in accordance with the attitude of a terminal device 2.

FIG. 3 shows an example of method for determining the display range in accordance with the attitude of the terminal device 2. In the example embodiment, as shown in FIG. 3, a three dimensional model is located in a virtual space, and a virtual camera C1 is located at a prescribed position inside the three dimensional model (in the example embodiment, a position which is substantially the center of the three dimensional model). For generating an image of the three dimensional model as seen from the virtual camera C1 (image of inner side surfaces of the three dimensional model), image rendering is performed as texture on the inner side surfaces of the three dimensional model. Thus, the panorama image to be displayed on the terminal device 2 is generated. Of the panorama image, a visual field of the vertical camera C1 (hatched area A1 in FIG. 3) is the display range. In the example embodiment, the three dimensional model is cubical. Alternatively, the three dimensional model may have any shape, for example, a spherical shape or a columnar (e.g., cylindrical) shape.

In FIG. 3, the attitude of the virtual camera C1 for generating an image to be displayed on the terminal device 2 is controlled in accordance with the attitude of the terminal device 2. Owing to this, the display range can be changed in accordance with the attitude of the terminal device 2. Hereinafter, an example of controlling the attitude of the virtual camera C1 in accordance with the attitude of the terminal device 2 will be described.

First, as initial setting, a reference attitude of the terminal device 2 is set. For example, the attitude of the terminal device 2 at the start of, or at a predetermined timing before the start of, the reproduction of the panorama moving image is set as the reference attitude of the terminal device 2. Specifically, the attitude of the terminal device 2 at the start of the reproduction of the panorama moving image may be set as the reference attitude; the attitude of the terminal device 2 when the user makes a prescribed operation before the start of the reproduction of the panorama moving image may be set as the reference attitude; a predefined fixed attitude of the terminal device 2 may be set as the reference attitude; or one of a plurality of predefined fixed attitudes of the terminal device 2 may be selected by the user as the reference attitude. In the example embodiment, the attitude of the terminal device 2 is calculated based on an output value from the gyrosensor 15, and therefore, setting of the reference attitude is resetting of the attitude value calculated by the gyrosensor 15. Alternatively, for setting the reference attitude of the terminal device 2, an appropriate processing operation may be executed depending on the type of the sensor.

As initial setting, an initial attitude of the virtual camera C1 is set. For example, the initial attitude of the virtual camera C1 is set such that the line-of-sight direction (z-axis positive direction) of the virtual camera C1 matches a Z-axis positive direction of the virtual space (front direction of the panorama image), a leftward direction (x-axis positive direction) of the virtual camera C1 matches an X-axis positive direction of the virtual space, and an upward direction (y-axis positive direction) of the virtual camera C1 matches a Y-axis positive direction of the virtual space.

In accordance with a change of the attitude of the terminal device 2 with respect to the reference attitude (direction and amount of rotation about an xt axis, which is the left-right direction of the terminal device 2 at the reference attitude, about a yt axis, which is the up-down direction of the terminal device 2 at the reference attitude, and about a zt axis, which is a front-rear direction of the terminal device 2 at the reference attitude), the attitude of the virtual camera C1 is changed from the initial attitude (typically, the virtual camera C1 is rotated about the x axis, y axis and z axis of the virtual camera C1 at the initial attitude, namely, about the X axis, the Y axis and the Z axis, in the same direction by the same amount as those of the rotation of the terminal device 2 about the xt axis, the yt axis and the zt axis, respectively). The information processing system 1 may change the size of the display range (may perform zoom-in or zoom-out) in accordance with an operation made on the terminal device 2 in addition to the position of the display range.

By contrast, a virtual camera (not shown) for generating an image to be displayed on the monitor 4 is set such that the line-of-sight thereof is basically directed in a prescribed reference direction (herein, the front direction, which is the above-described proceeding direction; Z-axis positive direction). Namely, the display range on the monitor 4 (hatched area A2 in FIG. 3) is set at a position in the front direction from the virtual camera. The position of the virtual camera is also fixed at a prescribed position (in the example embodiment, the central position of the three dimensional model).

In the example embodiment, the line-of-sight direction of the virtual camera C1 is controlled such that the relationship between the line-of-sight direction of the panorama image displayed on the monitor 4 and the line-of-sight direction of the panorama image displayed on the terminal device 2 generally matches the relationship between a depth direction of the display screen of the monitor 4 and a depth direction of the LCD 11 of the terminal device 2. Specifically, the above-described reference attitude is set in a state where the depth direction of the LCD 11 of the terminal device 2 is directed toward the monitor 4, and thus in this state, the line-of-sight direction of the virtual camera C1 is initially set in the same direction as the line-of-sight direction of the virtual camera for the monitor 4. When the attitude of the terminal device 2 is changed from the reference attitude, the attitude of the virtual camera C1 is changed in a direction in accordance with the change of the attitude by an amount in accordance with the amount of change. Owing to this, the user can change the orientation of the terminal device 2 while viewing a scene in a line-of-sight direction (front direction) by use of the monitor 4, and thus can view a scene in a desired direction (direction other than the front direction). The user can also direct the depth direction of the LCD 11 of the terminal device 2 toward the monitor 4, and thus can easily have the panorama image in the front direction displayed on the LCD 11. In this manner, the user can handle the position of the monitor 4 as the reference for displaying the panorama image (reference by which the panorama image in the front direction is displayed). Moreover, when the change of the attitude of the terminal device 2 matches the change of the attitude of the virtual camera C1, the orientation of the terminal device 2 in a real space matches the line-of-sight direction of the virtual camera C1 in the virtual space. Therefore, the user can feel that the space represented by the panorama image is highly realistic.

[Sound Output in Accordance With Display Direction of Panorama Image]

Figure 4:
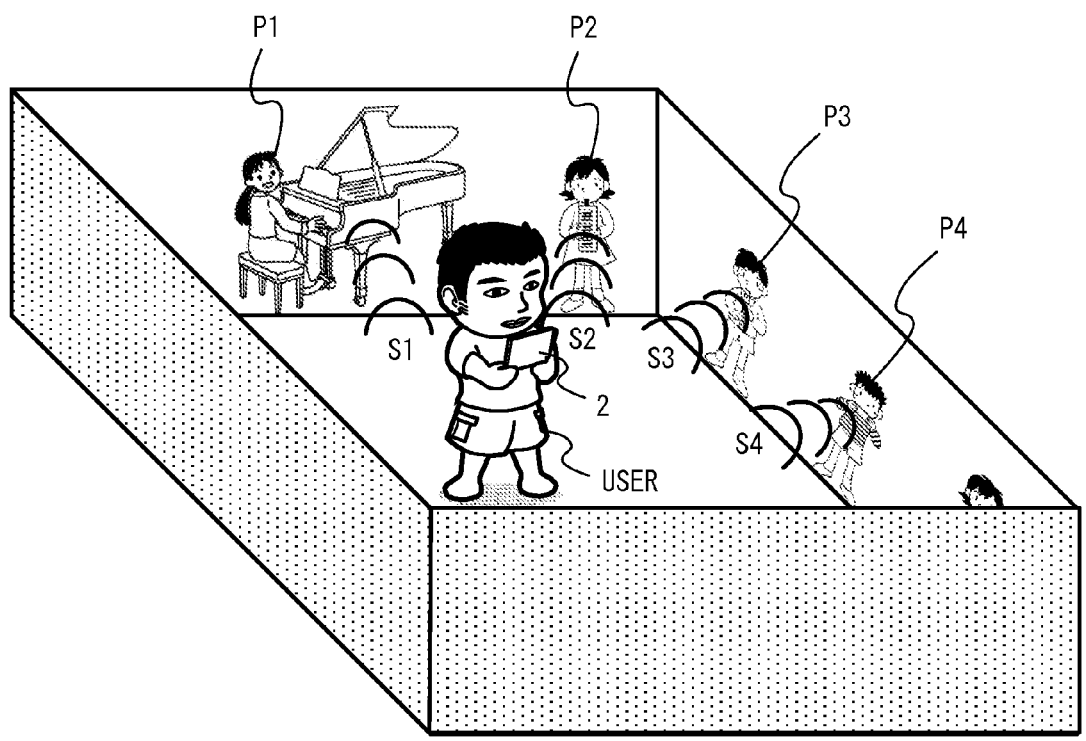
FIG. 4 shows a non-limiting example of virtual three dimensional space defined by an information processing program executed by the information processing system 1.
Figure 5:
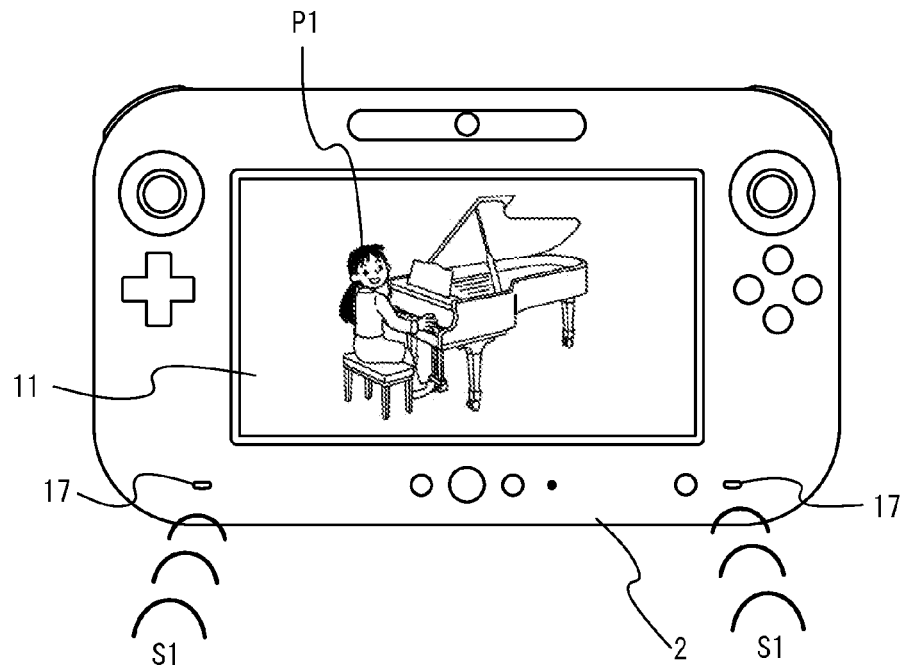
FIG. 5 shows a non-limiting example of sound output performed when a panorama image is displayed on the terminal device 2.
Figure 6:
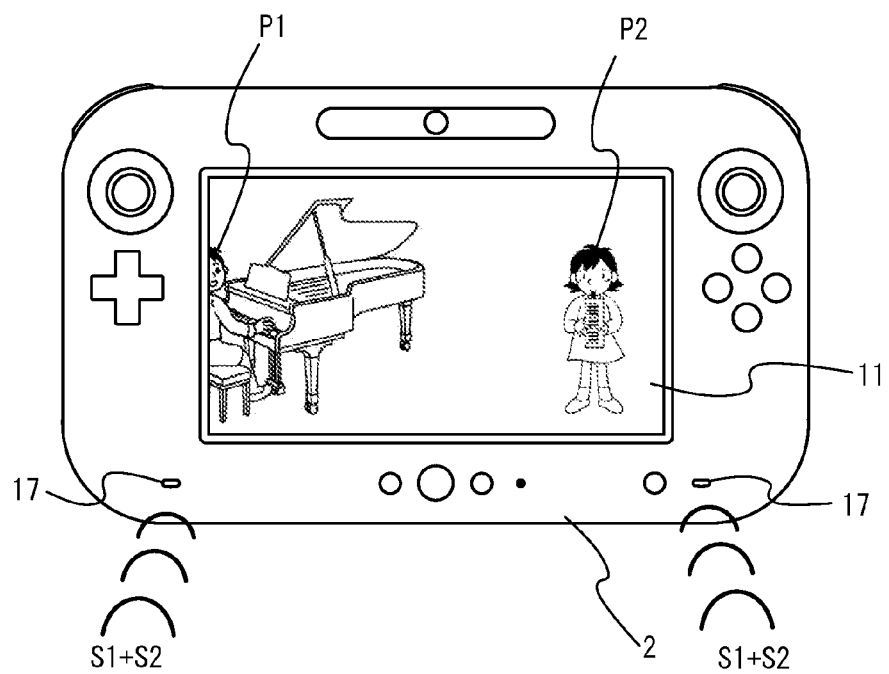
FIG. 6 shows another non-limiting example of sound output performed when a panorama image is displayed on the terminal device 2.
Figure 7:
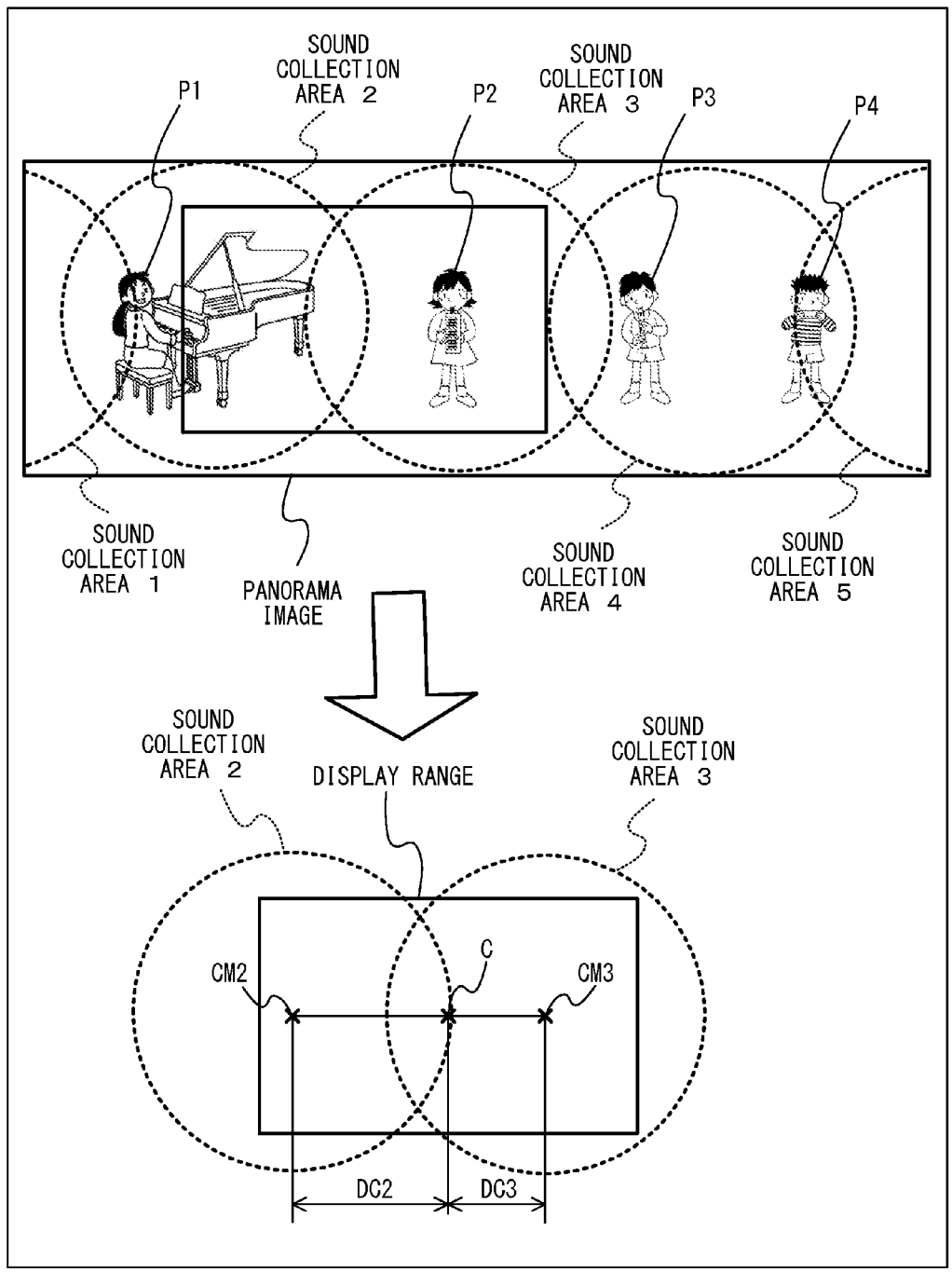
FIG. 7 shows a non-limiting example of sound output performed by use of sound data recorded by a plurality of directional microphones provided at a point of view at which the panorama moving image is captured.
Figure 8:
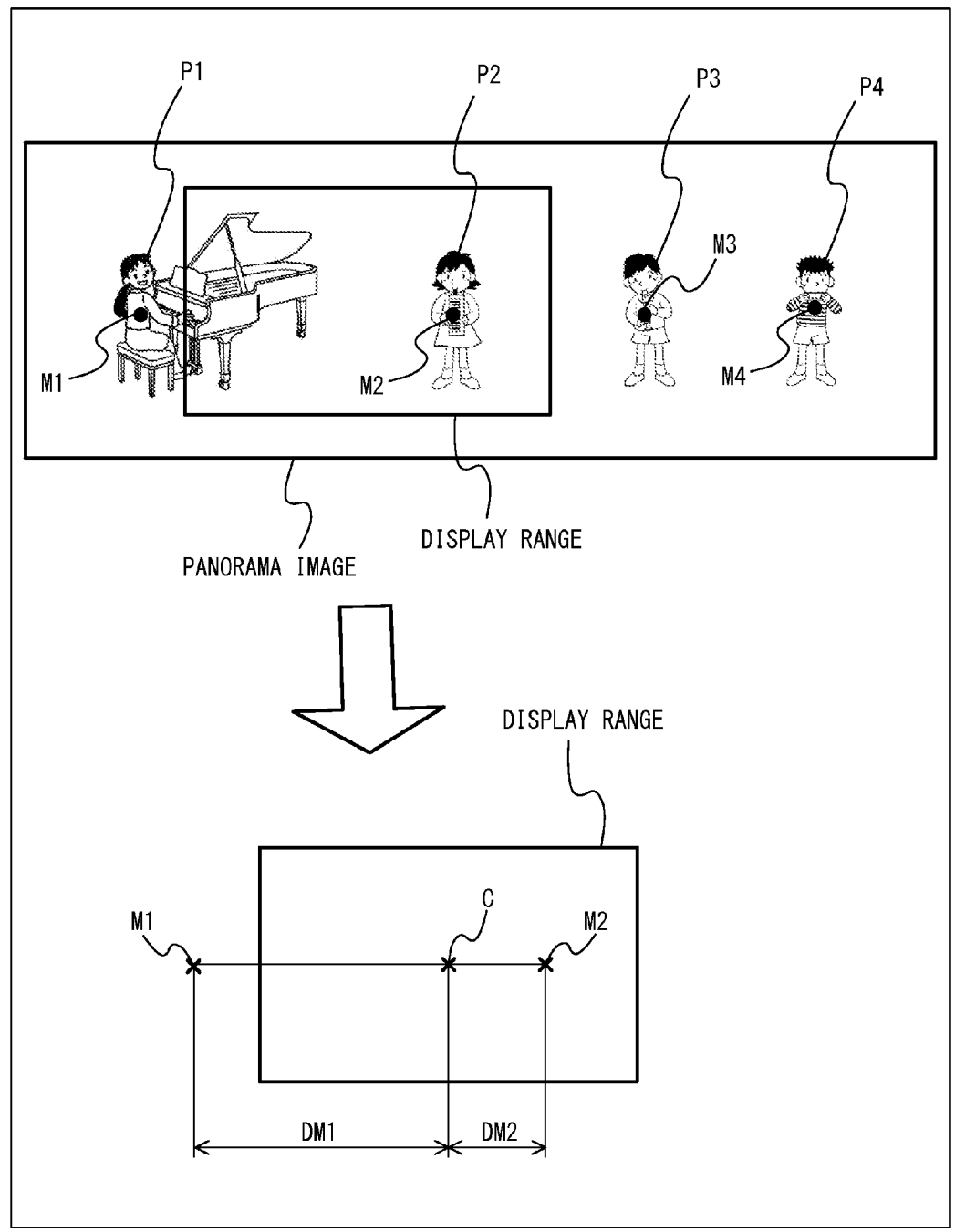
FIG. 8 shows a non-limiting example of sound output performed by use of sound data recorded by microphones respectively provided at a plurality of sound collection positions.
Figure 9:
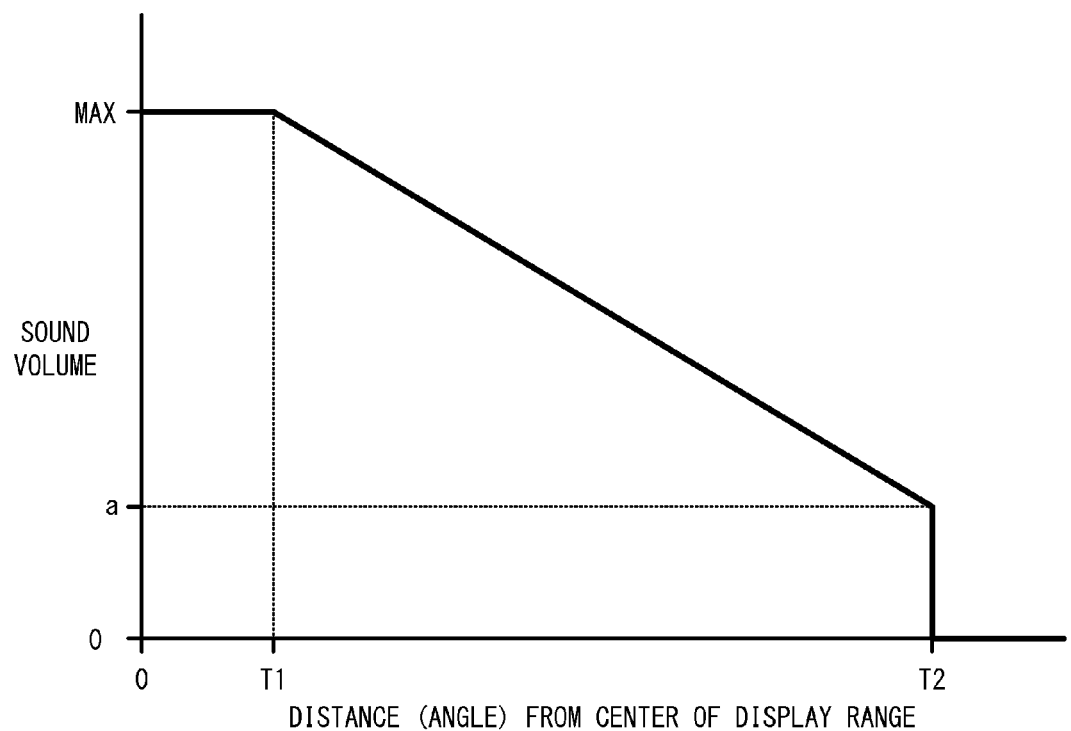
FIG. 9 shows a non-limiting first example of sound volume control on the sound output performed in accordance with the display range of a panorama image.
Figure 10:
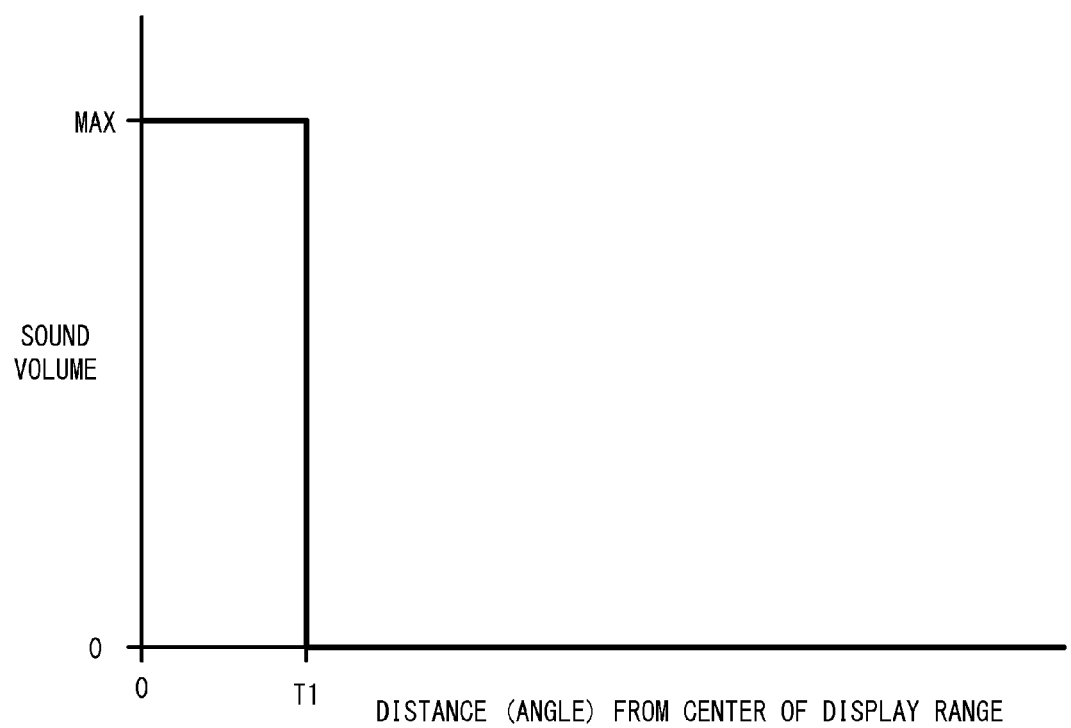
FIG. 10 shows a non-limiting second example of sound volume control on the sound output performed in accordance with the display range of the panorama image.
Figure 11:
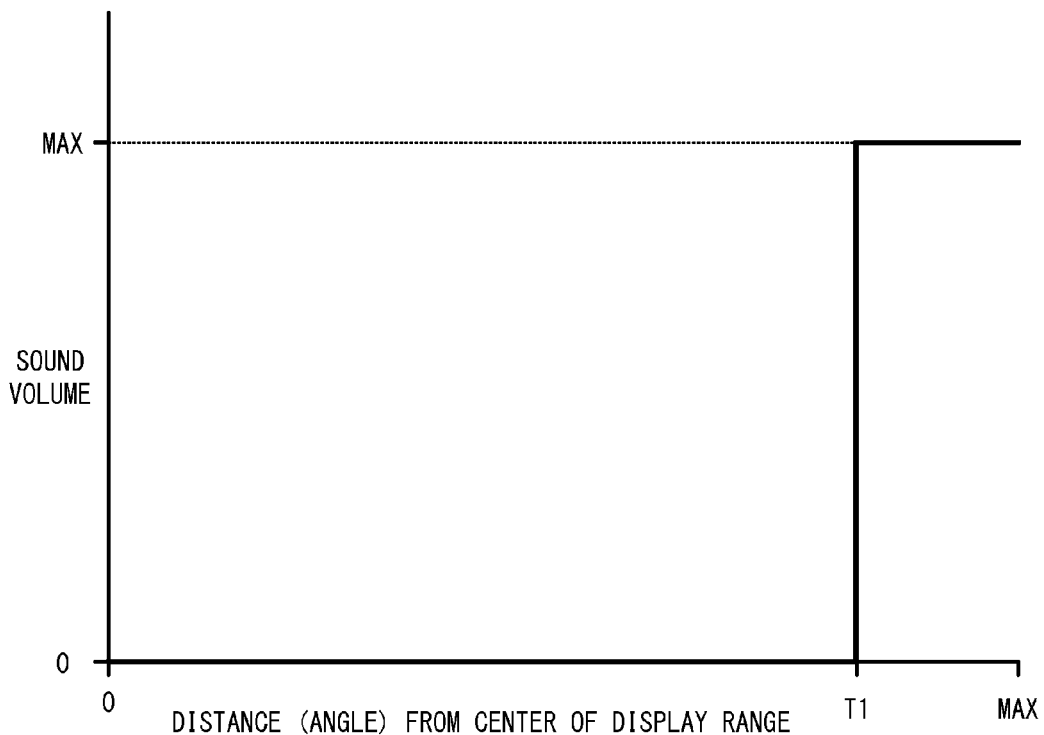
FIG. 11 shows a non-limiting third example of sound volume control on the sound output performed in accordance with the display range of the panorama image.

Now, with reference to FIG. 4 through FIG. 11, a sound which is output along with the reproduction of a panorama moving image will be described. FIG. 4 shows an example of virtual three dimensional space (virtual world formed by reproduction of a panorama image) defined by an information processing program executable by the information processing system 1. FIG. 5 shows an example of sound output performed when the panorama image is displayed on the terminal device 2. FIG. 6 shows another example of sound output performed when the panorama image is displayed on the terminal device 2. FIG. 7 shows an example of sound output performed by use of sound data which is recorded by a plurality of directional microphones provided at a point of view at which the panorama moving image is captured. FIG. 8 shows an example of sound output performed by use of sound data which is recorded by microphones respectively provided at a plurality of sound collection positions. FIG. 9 shows a first example of volume control on sound output performed in accordance with the display range of the panorama image. FIG. 10 shows a second example of volume control on sound output performed in accordance with the display range of the panorama image. FIG. 11 shows a third example of volume control on sound output performed in accordance with the display range of the panorama image.

As described above, as the reproduction of the panorama moving image proceeds, panorama images, each of which is a frame of the stored panorama moving image, are read at a cycle of a prescribed time length and sequentially displayed on the terminal device 2. The panorama image of each frame is pasted as texture on inner surfaces of the three dimensional model in the virtual space, and the inner surfaces are viewed from the virtual camera C1 located inside the model. Thus, the panorama image to be displayed on the terminal device 2 is generated, and the orientation of the virtual camera C1 is changed in accordance with the attitude of the terminal device 2. Therefore, as shown in FIG. 4, the user can view an image via the terminal device 2 as if he/she was looking at a space represented by the panorama image. Although the three dimensional model is cubic (hexahedral) in the example embodiment, FIG. 4 shows the three dimensional model as a prism for the same of simplicity. The panorama image is pasted as texture on the inner surfaces of the prism. The user can view an image via the terminal device 2 as if he/she was looking at the inner surfaces from the center of the three dimensional model.

Now, it is assumed that, for example, a panorama moving image of a plurality of players P1 through P4 located as surrounding the image capturing point of view of the panorama moving image and each playing a musical instrument is captured and used. In this case, while the panorama moving image is captured, sounds S1 through S4 which are respectively made by the players P1 through P4 playing the musical instruments are also recorded. During the reproduction of such a panorama moving image, as shown in FIG. 4, a panorama image which is pasted on the inner surfaces of the three dimensional model shows the players P1 through P4 surrounding the user located at the center of the three dimensional model (i.e., point of view at which the panorama moving image is captured) and playing the musical instruments. The sounds recorded while the panorama moving image is captured are output along with the reproduction of the panorama moving image.

In the example embodiment, the sounds to be output from the speaker 17 are adjusted in accordance with the display direction (display range) of the panorama moving image displayed on the terminal device 2. For example, in the case where the player P1 is displayed on the terminal device 2 as shown in FIG. 5, the sound S1 made by the player P1 at the time of capturing the panorama moving image is output from the speaker 17 in a state of standing out. In the case where the players P1 and P2 are displayed on the terminal device 2 as shown in FIG. 6, the sounds S1 and S2 made by the players P1 and P2 at the time of capturing the panorama moving image are output from the speaker 17 in a state of standing out. For allowing a certain sound to stand out, at least one of a process of increasing the volume of the certain sound, a process of decreasing the sounds other than the certain sound, and a process of not outputting the sounds other than the certain sound may be performed. Owing to such a control on sound output, the user of the terminal device 2 feels as if the sound S1 was made by the player P1, the sound S2 was made by the player P2, the sound S3 was made by the player P3, and the sound S4 was made by the player P4 along with the display of the panorama image. Therefore, the user can feel that the space represented by the panorama image is highly realistic.

In the case where the terminal device 2 includes a plurality of speakers, the distribution (balance) of the sounds output from the speakers can be adjusted in accordance with the display direction (display range) of the panorama image displayed on the terminal device 2. In the example shown in FIG. 6, the panorama image displayed on the terminal device 2 shows the player P1 on the left and the player P2 on the right as seen from the viewer. In this case, the speaker 17 on the left outputs the sound S1 as standing out more than the sound S2, and the speaker 17 on the right outputs the sound S2 as standing out more than the sound S1. Owing to this, the sounds are output highly realistically in accordance with the space represented by the panorama image. Even in the case where the terminal device 2 includes a plurality of speakers, the speakers may output the same sound (i.e., make a monaural output).

Now, an example of method for controlling the sound which is output from the speaker 17 in accordance with the display direction (display range) of the panorama image displayed on the terminal device 2 will be described. For example, for capturing a panorama moving image of the real world, a plurality of real world image-capturing cameras, the image-capturing direction of which are fixed to each other, are used. In an example, six real world image-capturing cameras are provided at fixed positions. The image-capturing directions of these cameras are, respectively, directions radiating from side surfaces and a top surface of a support member having a pentagonal prism shape. The six real world image-capturing cameras capture an image of the real world while moving in a forward direction, which is the direction in which one of the side surfaces is directed (front surface). The direction in which the six real world image-capturing cameras move is the "front direction" of the panorama moving image. Alternatively, the real world image-capturing cameras may be fixed at fixed positions in the real world to capture a panorama moving image. For example, the panorama image shown in FIG. 4 is captured by the real world image-capturing cameras fixed in the real world and shows the plurality of players surrounding the real world image-capturing cameras and playing the respective musical instruments.

In a first example, while the panorama moving image is captured, the sounds are recorded by directional microphones provided at a point of view at which the panorama moving image is captured. In the case where, for example, a panorama moving image is to be captured by use of the above-mentioned real world image-capturing cameras, highly directional microphones are provided inside the support member respectively for collecting sounds in a plurality of directions (e.g., six directions including five horizontal directions which are the same as the image-capturing directions of the real world image-capturing cameras, and the upward direction). The sound around each of the microphones is collected along with the capturing of the panorama moving image. Owing to this sound recording process, sound data of the sounds recorded in sound collection areas in the plurality of directions of the highly directional microphones along with the capturing of the panorama moving image is obtained.

In the case where the panorama moving image is to be captured by use of the real world image-capturing cameras and the directional microphones described above, a sound collection area of each directional microphone can be set in each panorama image included in the panorama moving image. In the example shown in FIG. 7, a part of the captured panorama image is shown. In the panorama image, sound collection areas 1 through 5 of the directional microphones are shown. For example, the sound collection area 2 is set in a space where the player P1 is playing and the vicinity thereof. The sound collection area 3 is set in a space where the player P2 is playing and the vicinity thereof. The sound collection area 4 is set in a space where the players P3 and P4 are playing and the vicinity thereof.

The panorama moving image and the sounds captured and recorded in this manner are reproduced as follows by use of the terminal device 2: as the reproduction of the panorama moving image proceeds, panorama images each of which is a frame of the stored panorama moving image, and sound data corresponding to the respective frames, are read at a cycle of a predetermined time length and sequentially displayed and output. On the terminal device 2, a display range, which is a part of the read panorama image, is displayed. From the terminal device 2, the sound corresponding to the display range of the panorama moving image is output. For example, it is assumed that as shown in FIG. 7, a display range of the panorama image including a part of the musical instrument played by the player P1 and also including the player P2 is displayed on the terminal device 2. In this case, the display range includes the sound collection areas 2 and 3. Thus, the terminal device 2 outputs the sounds collected from the sound collection areas 2 and 3 in a state of standing out.

This will be described specifically. In the example shown in FIG. 7, the ratio of the sound collection area 3 with respect to the display range is higher than the ratio of the sound collection area 2 with respect to the display range. Namely, distance DC3 from center C of the display range to center CM3 of the sound collection area 3 is shorter than distance DC2 from the center C of the display range to center CM2 of the sound collection area 2. In this case, although the sounds collected from the sound collection areas 2 and 3 are output from the terminal device 2 in a state of standing out, the ratio of the sound (sound volume) collected from the sound collection area 3 is higher than that of the sound collected from the sound collection area 2. In an example, the ratio between the sound collected from the sound collection area 2 and the sound collected from the sound collection area 3 may be set in accordance with the ratio between the center-to-center distance DC2 and the center-to-center distance DC3. Owing to this, highly realistic sounds in accordance with the display range are output.

The display range is defined by the line-of-sight direction of the virtual camera C1 located in the three dimensional model, and may be considered as the display direction with respect to the panorama image pasted on the three dimensional model. The sound collection area of each directional microphone is defined by the direction in which the respective directional microphone collects the sound, and may be considered as the sound collection direction during the capturing of the panorama moving image. Namely, the above-mentioned center-to-center distance from the center of the display range to the center of each sound collection area may be considered as an angle difference between the display direction (line-of-sight direction of the virtual camera C1) and the sound collection direction of the respective sound collection area.

In a second example, while the panorama moving image is captured, the sounds are recorded by the microphones respectively located at a plurality of sound collection positions. In the case where, for example, a panorama moving image of the above-described plurality of players P1 through P4 is to be generated, the microphones are respectively set in the vicinity of the players P1 through P4 (e.g., the microphones are attached to the players P1 through P4 or put in front of the players P1 through P4). The sound of each player is collected by the corresponding microphone along with the capturing of the panorama moving image. Owing to this sound recording process, sound data of the sounds of the respective players P1 through P4 recorded along with the capturing of the panorama moving image is obtained.

In the case where a panorama image is to be captured by use of the real world image-capturing cameras and the microphones which are respectively set at the positions of the players, the position of the microphone in accordance with the position of each player can be set in each panorama image included in the panorama moving image. In the example shown in FIG. 8, a part of the captured panorama image is shown. In the panorama image, a microphone M1 of the player P1, a microphone M2 of the player P2, a microphone M3 of the player P3, and a microphone M4 of the player P4 are shown.

For example, it is assumed that as shown in FIG. 8, a display range of the panorama image including a part of the musical instrument played by the player P1 and also including the player P2 is displayed on the terminal device 2. In this case, the display range includes the microphone M2, and the microphone M1 is located closer to the display range than the other microphones M3 and M4. Therefore, the terminal device 2 outputs the sounds collected from the microphones M1 and M2 in a state of standing out.

This will be described specifically. In the example shown in FIG. 8, distance DM2 from the center C of the display range to the position of the microphone M2 is shorter than distance DM1 from the center C of the display range to the position of the microphone M1. In this case, although the sounds collected by use of the microphones M1 and M2 are output from the terminal device 2 in a state of standing out, the ratio of the sound (sound volume) collected by use of the microphone M2 is higher than that of the sound collected by use of the microphone M1. In an example, the ratio between the sound collected by use of the microphone M1 and the sound collected by use of the microphone M2 may be set in accordance with the ratio between the distance DM1 and the distance DM2. Owing to this, highly realistic sounds in accordance with the display range are output.

The position at which each microphone is displayed in the panorama image (or the position at which each player is displayed) may be considered as a microphone setting direction with respect to the position of the virtual camera C1. Namely, the distance from the center of the display range to the position of each microphone may be considered as an angle difference between the display direction (line-of-sight direction of the virtual camera C1) and the setting direction of the respective microphone.

For recording the sounds by use of the microphones respectively provided at a plurality of sound collection positions and controlling the sounds to be output in accordance with the display direction (display range) as described above, the sound collection data of the sound recorded by use of each microphone, and microphone position information which is used to add the positions of the microphones used for obtaining the sound collection data to each panorama image included in the panorama moving image, are managed. For example, the microphone position information is information which can specify a microphone position in the panorama image.

In an example, the microphone position information may be information on a vector representing the attitude (line-of-sight direction) of the virtual camera C1 for generating the image displayed on the terminal device 2. For example, the microphone position can be represented by a vector representing the direction from the position of the virtual camera C1 toward the microphone on the three dimensional model. In the case where the point of view at which the panorama moving image is captured moves in a prescribed space (e.g., real world) as the time passes, the microphone position is also moved on the three dimensional model in accordance with the movement of the point of view. In the real world, the microphone (i.e., the player) may move during the capturing of the panorama moving image. In this case, as the microphone moves in the real world, the microphone position may be moved on the three dimensional model to set the microphone position information. In the case where the microphone position is moved in the real world, only a horizontal-direction component of the movement may be set as the microphone position information on the movement. For example, in order to allow the microphone position to move only in the XY direction of the three dimensional model from the pre-movement microphone position on the three dimensional model as the microphone moves in the real world, the microphone position information on such a movement is represented only by the XY direction of the three dimensional model (i.e., the post-movement microphone position in the Z direction is fixed to the pre-movement microphone position in the Z direction). In this manner, the information on the movement of the microphone in the real world may be represented only by the XY direction, so that the processing operation regarding the movement of the microphone can be simplified.

Alternatively, the sounds recorded along with the reproduction of the panorama moving image may be added to the panorama moving image. For example, after the panorama moving image is captured as described above, a sound stream corresponding to the panorama moving image file may be added, or the user reproducing the panorama moving image may make a prescribed operation to add a prescribed sound as additional information to a part of the panorama moving image specified by the operation. In an example of the former arrangement, a subject appearing in the panorama moving image is set as a sound source, and a sound stream is added to the panorama moving image in advance as a sound made by the sound source. In an example of the latter arrangement, the user inputs a sound while specifying a part of the panorama moving image displayed on the terminal device 2 or the monitor 4, so that the sound is added as additional information to the part of the panorama moving image which is being reproduced.

Also for adding the sound, recorded along with the reproduction of the panorama moving image after the panorama moving image is captured, to the panorama moving image as described above, the sound collection data corresponding to the sound to be added, and position information which is used to add the sound to the panorama moving image, are managed. For example, in the case where a sound stream as the sound made by the sound source is to be added to the panorama moving image, the position information represents the position of the sound source in each panorama image included in the panorama moving image. In the case where the user adds the sound, the position information represents the input position specified by the user in each panorama image included in the panorama moving image. The position information can be set and managed in substantially the same manner as the microphone position information. Hereinafter, in the case where a sound, recorded along with the reproduction of the panorama moving image after the panorama moving image is captured, is added to the panorama moving image, the sound information and the position information will be referred to as "additional sound information" and "additional position information", respectively.

Now, a method of sound control performed such that the sound which is output from the speaker 17 stands out in accordance with the display direction (display range) of the panorama image displayed on the terminal device 2 will be described. In a first example, as shown in FIG. 9, as the distance from the center C of the display range to the center of the sound collection area or to the microphone position becomes shorter (as the angle difference between the display direction and the sound collection direction or the microphone setting direction becomes smaller), the volume of the sound as a control target may be gradually increased. In the first example, the sound output is controlled such that as the center of the display range becomes closer to the sound source, the volume of the sound at the sound source is gradually increased. In the example shown in FIG. 9, when the distance (or the angle difference) is equal to or greater than a threshold value T2, the sound as the control target is not the output target (i.e., the sound volume is 0). When the distance (or the angle difference) is less than the threshold value T2, the sound is the output target (i.e., the sound volume is greater than 0; in the example in FIG. 9, equal to or greater than volume a). When the distance (or the angle difference) is less than the threshold value T2 and equal to or greater than a threshold T1 (T1<T2), as the distance becomes shorter (or the angle difference becomes smaller), the volume of the sound as the control target is gradually increased from the minimum volume a to a maximum volume MAX. The minimum volume a may be 0 or greater and less than the maximum volume MAX. When the distance (angle difference) is less than the threshold value T1, the volume of the sound as the control target is set to the maximum volume MAX. The threshold value T1 may be set to 0 so that only when the distance (angle difference) is 0, the volume of the sound as the control target is the maximum volume MAX.

In a second example, as shown in FIG. 10, only when the distance from the center C of the display range to the center of the sound collection area or the microphone position is less than a prescribed value (the angle difference between the display direction and the sound collection direction or the microphone setting direction is less than a prescribed value), the sound as the control target may be output at a prescribed volume (e.g., the maximum volume MAX). In the second example, only when the center of the display range is within a prescribed range from the sound source, the sound at the sound source is output. Therefore, the sound output is controlled such that the sound at the sound source is turned ON or OFF in accordance with whether the center of the display range is within the prescribed range from the sound source or not. In the example shown in FIG. 10, when the distance (or the angle difference) is equal to or greater than the threshold value T1, the sound as the control target is not the output target (i.e., the sound volume is 0). When the distance (or the angle difference) is less than the threshold value T1, the sound is the output target (i.e., the sound volume is greater than 0) and is set to the maximum volume MAX.

A third example is typically used for control performed such that the additional sound stands out. As shown in FIG. 11, only when the distance from the center C of the display range to the additional position based on the additional position information is equal to or greater than a prescribed value (the angle difference between the display direction and the direction in which the additional sound is added is equal to or greater than a prescribed value), the sound as the control target is output at a prescribed volume (e.g., the maximum volume MAX). In the third example, only when the center of the display range is outside a prescribed range from the sound source, the sound at the sound source is output. Therefore, the sound output is controlled such that when the display direction is opposite to the direction toward the sound source, the sound at the sound source is turned ON; whereas when the display direction is the direction toward the sound source, the sound at the sound source is turned OFF. In the example shown in FIG. 11, when the distance (or the angle difference) is less than the threshold value T1, the sound as the control target is not the output target (i.e., the sound volume is 0). When the distance (or the angle difference) is equal to or greater than the threshold value T1, the sound is the output target (i.e., the sound volume is greater than 0) and is set to the maximum volume MAX.

In this manner, the sound output from the speaker 17 is adjusted in accordance with the display direction (display range) of the panorama image displayed on the terminal device 2, so that when the panorama image is displayed, an enhanced sense of being at the site of the image can be provided. In the example described above, mixing of the plurality of sounds is performed in accordance with the display direction (display range) of the panorama image. Therefore, the localization of the sound source with respect to the panorama image can be changed. As a result, various events using the localization of the sound source can be made.

The example described above may be arranged such that the sound at the sound source is output only when the panorama image displayed on the terminal device 2 encompasses the sound source. For example, the threshold value T2 shown in FIG. 9 or the threshold value T1 shown in FIG. 10 may be set on an outer perimeter of the display range of the panorama image displayed on the display device 2, so that the sound at the sound source can be adjusted to be output in accordance with whether the sound source is encompassed in the display range of the panorama image or not.

In the example described above, the volume of the sound at the sound source is controlled based on the distance from the center of the display range to the sound source (center of the sound collection area, microphone position, position at which the sound is added, etc.) or the corresponding angle difference. The sound volume may be controlled based on any other parameter. For example, a range in which the sound at the sound source is the output target (e.g., sound collection areas shown in FIG. 7) may be set in the panorama image in correspondence with each of the sound sources, so that in accordance with the size (ratio) of the range encompassed in the panorama image displayed on the terminal device 2, the volume of the sound at the sound source corresponding to the range may be controlled.

In the case where the image displayed on the terminal device 2 can be enlarged or reduced, the sound output can be controlled in accordance with the enlargement or the reduction of the displayed image. In an example, the distance or the angle difference described above is enlarged (or reduced) in accordance with the ratio of enlargement (or the ratio of reduction), and the distance or the angle difference after the enlargement (or reduction) is applied to the sound output control method in each of the first through third examples. In another example, a range in which the sound at the sound source is the output target is set for each sound source as described above, and in accordance with the size (or ratio) of the range encompassed in the panorama image displayed on the terminal device 2 after the enlargement (or reduction), the volume of the sound at the sound source corresponding to the range is controlled. In this manner, the sound output may be further controlled in accordance with the enlargement or the reduction of the display image, so that the sounds can be output such that the sound standing out is changed in accordance with the display range of the panorama image displayed on the terminal device 2.

Specific Examples of Processing Operations in Example Embodiment

Figure 12:
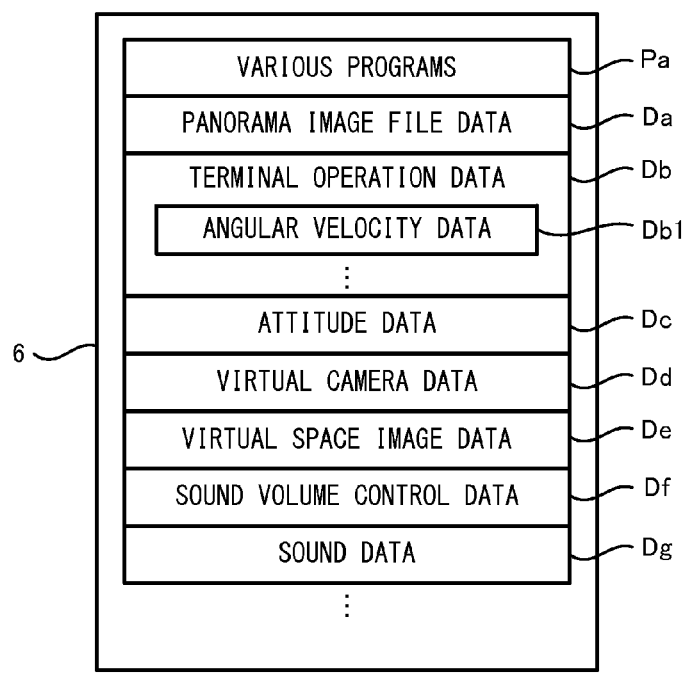
FIG. 12 shows a non-limiting example of main data and programs stored on a memory 6 of an information processing device 3.

Now, the processing operation performed by the information processing device 3 will be described in detail. In the following description of the processing operation, an example of using the sounds recorded by the microphones respectively provided at the plurality of sound collection positions (see FIG. 8) will be used. First, with reference to FIG. 12 and FIG. 13, main data used in the processing operation will be described. FIG. 12 shows an example of main data and programs stored on the memory 6 of the information processing device 3. FIG. 13 shows an example of panorama image file data Da stored on the memory 6.

As shown in FIG. 12, in a data storage area of the memory 6, the panorama image file data Da, terminal operation data Db, attitude data Dc, virtual camera data Dd, virtual space image data De, sound volume control data Df, sound data Dg and the like are stored. The memory 6 may store, in addition to the data shown in FIG. 12, data usable for an application to be executed, other data usable for the processing operation and the like. In a program storage area of the memory 6, a group Pa of various programs included in the information processing program is stored.

With reference to FIG. 13, the panorama image file data Da will be described. As shown in FIG. 13, the panorama image file data Da includes panorama image data, sound data and the like as information of each frame. The panorama image data for each frame number n (1, 2, 3, . . . ) includes data representing a panorama image In to be pasted as texture to the inner surfaces of the above-described three dimensional model. For example, the panorama moving image which is encoded and stored on a prescribed storage medium is decoded by the method used to encode the panorama moving image, and thus the panorama image data is obtained.

The sound data, of the panorama image file data Da, of each frame number n includes, for example, microphone position information ($Am1n$, $Am2n$, $Am3n$, . . . ) and sound collection data ($Sm1n$, $Sm2n$, $Sm3n$, . . . ) of the plurality of microphones used for capturing the panorama moving image. The microphone position information represents the position of each microphone in the panorama image of each frame number n (the microphone setting direction, with respect to the position of the virtual camera, in the panorama image of each frame number n). For example, as information representing the microphone setting direction of the microphone M1 in the panorama image of the frame numbers n, microphone position information ($Am11$, $Am12$, $Am13$, . . . , $Am1n$) is stored. The sound collection data is sound data recorded by use of each microphone, and is stored in correspondence with each frame number n. For example, as the sound data recorded for the frame numbers n by use of the microphone M1, sound data ($Sm11$, $Sm12$, $Sm13$, . . . $Sm1n$) is stored.

The panorama image file data Da shown in FIG. 13 is merely an example. As long as substantially the same information is obtained, the structure of the data may be changed, or another data may be stored in addition to, and/or instead of, the data.

Returning to FIG. 12, the terminal device data Db represents a content of operations made on the terminal device 2, and includes angular velocity data Db1 and the like. The angular velocity data Db1 represents an angular velocity caused to the terminal device 2, which is output from the gyrosensor 15.

The attitude data Dc represents the attitude of the terminal device 2 in the actual space, for example, the rotation amount of the terminal device 2 from the reference attitude.

The virtual camera data Dd is data regarding the virtual camera located at the center of the three dimensional model. For example, the virtual camera data Dd is data on the position, attitude, viewing angle (angle of field) and the like of the virtual camera in the virtual space.

The virtual space image data De represents a virtual space image of the inner surfaces of the three dimensional model as viewed from the virtual camera.

The sound volume control data Df defines the sound output control performed when the sound based on the sound data of the panorama image data file Da is output. The sound volume control data Df defines a sound output control method carried out for each piece of the sound data of the panorama image file data Da, and defines, for example, the control method described above with reference to FIG. 9 through FIG. 11 in accordance with each sound source.

The sound data Dg represents the sound which is output from the speaker 17, which is controlled to be output based on the sound output control method defined by the sound volume control data Df.

Figure 14:
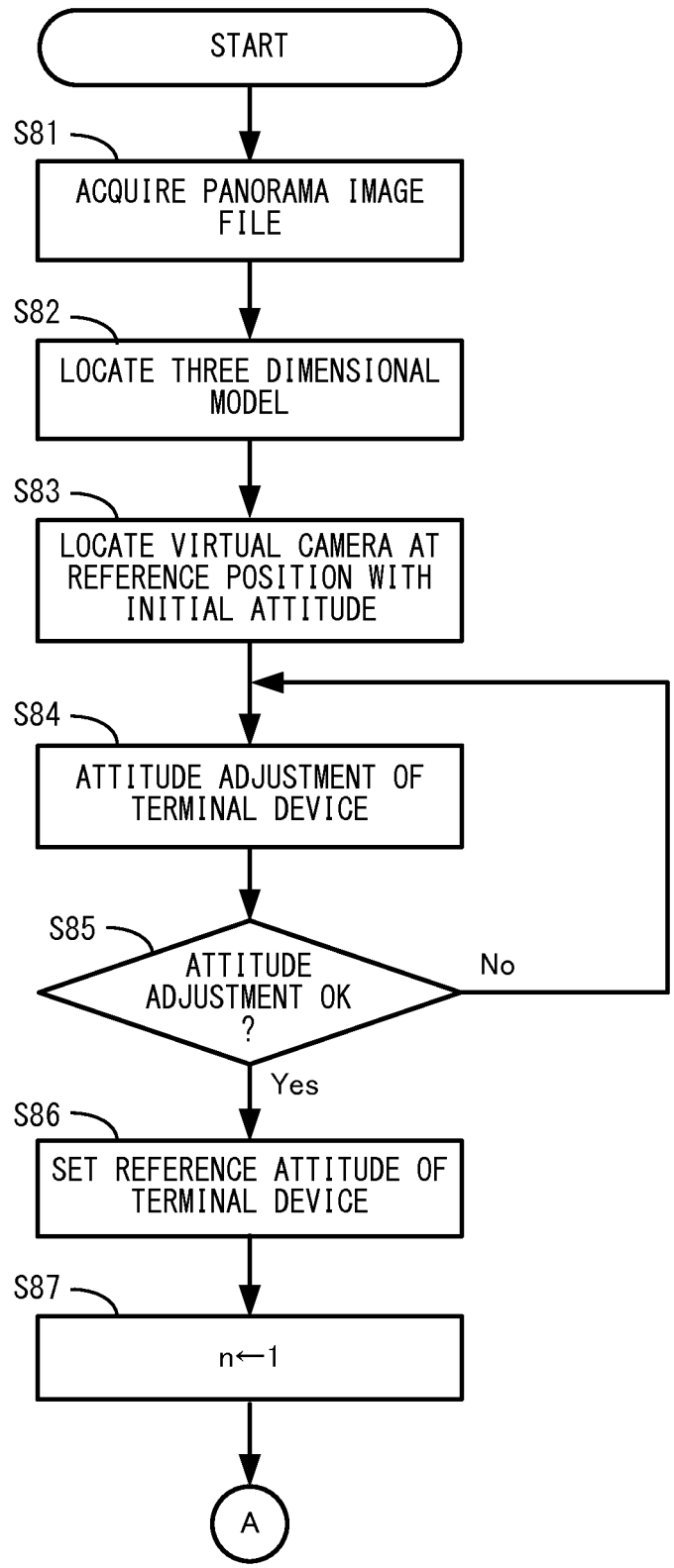
FIG. 14 is a flowchart showing a non-limiting example of first half of a processing operation executable by the information processing device 3.
Figure 15:
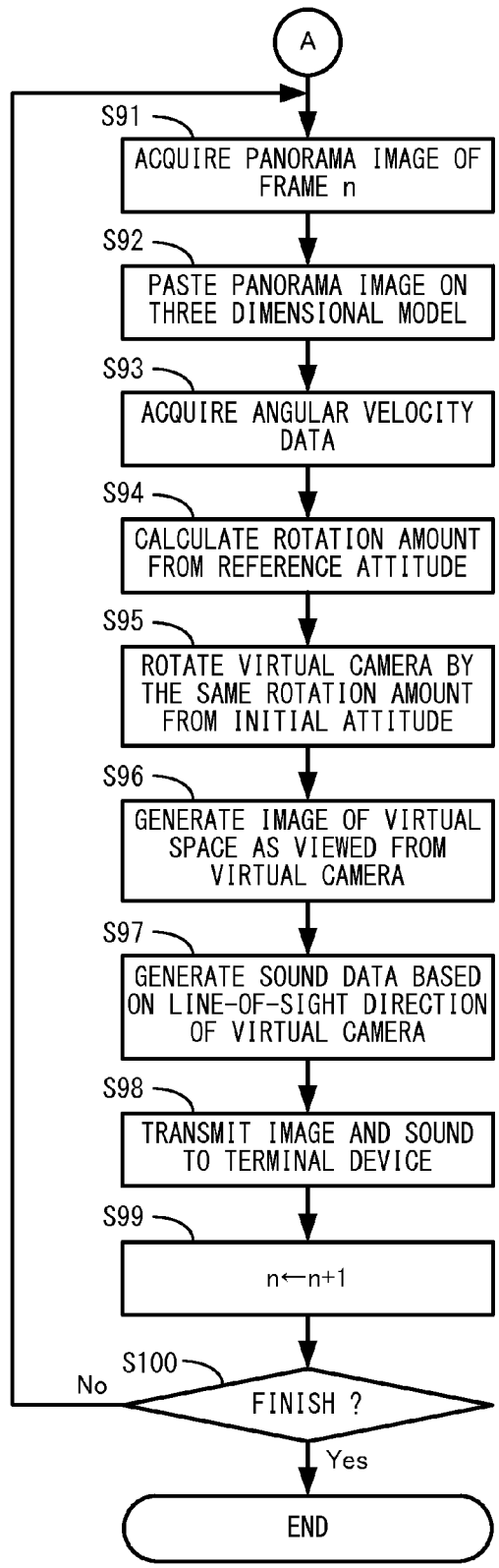
FIG. 15 is a flowchart showing a non-limiting example of second half of the processing operation executable by the information processing device 3.

Now, with reference to FIG. 14 and FIG. 15, the processing operation executed by the information processing device 3 will be described in detail. FIG. 14 is a flowchart showing an example of first half of the processing operation executed by the information processing device 3, and FIG. 15 is flowchart showing an example of second half of the processing operation executed by the information processing device 3. With reference to FIG. 14 and FIG. 15, a processing operation of displaying a panorama moving image on the terminal device 2 and outputting a sound will be mainly described among processing operations executed by the information processing device 3. Other processing operations which are not directly related to this processing operation will not be described in detail.

The CPU 5 initializes the memory 6 and the like, and reads the information processing program stored on a nonvolatile memory in the information processing device 3 or on an optical disc to the memory 6. Then, the CPU 5 starts execution of the information processing program. The flowcharts shown in FIG. 14 and FIG. 15 show the processing operation executed after the above processes are completed.

The steps in the flowcharts shown in FIG. 14 and FIG. 15 merely show an example. The order of the steps may be changed, or a different processing operation may be executed in addition to, or instead of, the processing operation shown in FIG. 14 and FIG. 15, as long as substantially the same results are obtained. In the example embodiment, each step in the flowcharts will be described as being executed by the CPU 5. Alternatively, a part of, or the entirety of, the steps in the flowcharts may be executed by a processor other than the CPU or a dedicated circuit.

Referring to FIG. 14, the CPU 5 acquires a panorama image file including sound data (step 81). For example, the CPU 5 acquires a panorama image file including sound data from a nonvolatile memory in the information processing device 3, from a storage medium mounted on the information processing device 3, or from another device via a network or the like, and stores the panorama image file including the sound data in the panorama image file data Da.

Next, the CPU 5 locates the three dimensional model, to which the panorama moving image is to be pasted, in the virtual space such that the center of the three dimensional model is positioned at the origin of the virtual space (step 82), and advances the processing operation to the next step. For example, in the case where the three dimensional model is cubic, the CPU 5 locates the three dimensional model with respect to XYZ axes set in the virtual space, such that a front surface of the three dimensional model perpendicularly crosses the Z axis on the positive side of the Z axis, a rear surface of the three dimensional model perpendicularly crosses the Z axis on the negative side of the Z axis, a left side surface of the three dimensional model perpendicularly crosses the X axis on the positive side of the X axis, a right side surface of the three dimensional model perpendicularly crosses the X axis on the negative side of the X axis, a top surface of the three dimensional model perpendicularly crosses the Y axis on the positive side of the Y axis, and a bottom surface of the three dimensional model perpendicularly crosses the Y axis on the negative side of the Y axis.

Next, the CPU 5 locates a virtual camera at the reference position with the initial attitude (step 83), and advances the processing operation to the next step. For example, the CPU 5 sets the origin of the virtual space (i.e., center of the three dimensional model) as the reference position of the virtual camera. The CPU 5 sets, as the initial attitude, the attitude with which xyz axes of the virtual camera (the x-axis positive direction is the leftward direction of the virtual camera, the y-axis positive direction is the upward direction of the virtual camera, and the z-axis positive direction is the line-of-sight direction of the virtual camera) match the XYZ axes of the virtual space. Then, the CPU 5 updates the data on the position and the attitude of the virtual camera in the virtual camera data Dd by use of the reference position and the initial attitude of the virtual camera.

Next, the CPU 5 urges the user to adjust the attitude of the terminal device 2 (step 84) and waits for the attitude to be adjusted (step 85).

In step 86, the CPU 5 sets the current attitude of the terminal device 2 as the reference attitude, and advances the processing operation to the next step. For example, the CPU 5 initializes the attitude of the terminal device 2 (rotation amount from the reference attitude) represented by the attitude data Dc (i.e., the CPU 5 sets the rotation amount about each axis to 0), and sets the resultant attitude as the reference attitude of the terminal device 2.

As described above, in the processes in steps 84 through 86, the attitude of the terminal device 2 at the time when the process in step 84 is performed or after elapse of a prescribed time length from such a time may be set as the reference attitude; the attitude of the terminal device 2 when the user makes a prescribed operation may be set as the reference attitude; a predefined fixed attitude of the terminal device 2 may be set as the reference attitude; or one of a plurality of predefined fixed attitudes may be selected by the user as the reference attitude. In an example, when the same panorama moving image is to be reproduced and displayed on the monitor 4 as on the terminal device 2, the CPU 5 provides a display on the terminal device 2 and/or the monitor 4 for urging the user to do the following: adjust the attitude of the terminal device 2 such that the orientation of the LCD 11 of the terminal device 2 matches the orientation of the display screen of the monitor 4; and make a prescribed operation on the terminal device 2 when the attitude is thus adjusted. When acquiring the operation data representing that the prescribed operation has been made on the operation section 13 of the terminal device 2, the CPU 5 determines that the attitude is adjusted as described above, and sets, as the reference attitude, the attitude of the terminal device 2 at the time when the operation is made. In this case, as a result of the processes in steps 84 through 86, the attitude of the terminal device 2 adjusted such that the orientation of the LCD 11 of the terminal device 2 matches the orientation of the display screen of the monitor 4 is set as the reference attitude of the terminal device 2.

Next, the CPU 5 sets frame number n to 1 (step 87), and advances the processing operation to the next step 91 (see FIG. 15).

Referring to FIG. 15, the CPU 5 acquires a panorama image corresponding to frame n among the panorama image data of the panorama image file data Da (step 91), and advances the processing operation to the next step.

Next, the CPU 5 pastes the panorama image acquired in step 91 as texture on inner surfaces of the three dimensional model (step 92), and advances the processing operation to the next step. For example, as described above with reference to FIG. 3, a panorama image is pasted as texture on each of the inner surfaces of the three dimensional model.

Next, the CPU 5 acquires an output value of the gyrosensor 15 of the terminal device 2 (step 93), and advances the processing operation to the next step. Data representing the output value of the gyrosensor 15 is transmitted from the terminal device 2 to the information processing device 3 at a cycle of a predetermined time length and stored in the angular velocity data Db1.

Next, the CPU 5 uses the data acquired in step 93 to calculate the rotation direction and the rotation amount of the terminal device 2 from the reference attitude (the rotation direction and the rotation amount after the initialization in step 86) (step 94), and advances the processing operation to the next step. For example, in step 94, the rotation direction and the rotation amount about each of prescribed axial directions of the terminal device 2 at the reference attitude (e.g., the xt axis, the yt axis and the zt axis at the reference attitude) are calculated, and the attitude data Dc is updated. The rotation direction can be represented by whether the rotation amount has a positive value or a negative value. Therefore, only data representing the rotation amount may be stored in the attitude data Dc. For example, the CPU 5 adds the rotation amount based on the angular velocity acquired in step 94 in the current process to the rotation amount calculated in step 94 in the immediately previous process to find a new rotation amount.

Next, the CPU 5 rotates the attitude of the virtual camera in the virtual space from the initial attitude by the rotation amount calculated in step 94 (step 95), and advances the processing operation to the next step. For example, the CPU 5 rotates the attitude of the virtual camera from the initial attitude about the X axis direction of the virtual space (x axis direction of the virtual camera C1 at the initial attitude) by the amount same as the rotation amount of the terminal device 2 about the xt axis direction calculated in step 94, about the Y axis direction of the virtual space (y axis direction of the virtual camera C1 at the initial attitude) by the amount same as the rotation amount of the terminal device 2 about the yt axis direction calculated in step 94, and about the Z axis direction of the virtual space (z axis direction of the virtual camera C1 at the initial attitude) by the amount same as the rotation amount of the terminal device 2 about the zt axis direction calculated in step 94. Then, the CPU 5 updates the data on the attitude of the virtual camera in the virtual camera data Dd.

Next, the CPU 5 generates an image of the inner surfaces of the three dimensional model as viewed from the virtual camera (virtual space image) (step 96), and advances the processing operation to the next step. For example, the CPU 5 uses data representing the generated virtual space image to update the virtual space image data De.

Next, the CPU 5 generates sound data based on the orientation of the virtual camera to update the sound data Dg (step 97), and advances the processing operation to the next step. For example, the CPU 5 refers to the panorama image file data Da to extract the microphone setting direction corresponding to frame number n, and calculates the angle difference between the line-of-sight direction of the virtual camera with respect to the three dimensional model at the current time and the microphone setting direction of each microphone. The CPU 5 sets the sound volume corresponding to the resultant angle difference based on the sound volume control data Df, and performs mixing of the sound collection data corresponding to frame number n in accordance with the set sound volume. Thus, the CPU 5 generates sound data to be output. The sound volume may be set in accordance with the distance or the direction between the center of the display range of the panorama image and the position of each microphone in the panorama image in frame number n.

In step 97, in the case where the terminal device 2 includes a plurality of speakers, the distribution (balance) of the sounds output from the speakers can also be adjusted in accordance with the display direction (display range) of the panorama image. For example, in the case where the terminal device 2 includes one speaker on the left and one speaker on the right, the distribution of the sound to the left speaker and the right speaker is adjusted based on, for example, the magnitude of the component about the up-down direction (y axis direction) of the virtual camera at the current time, among the angle difference calculated above, and whether the component has a positive value or a negative value. Thus, the sound data to be output from each of the left and right speakers is generated. The CPU 5 may generate the sound data after adding a prescribed surround effect (e.g., pseudo surround) based on the localization of the sound to be output. The surround effect may be added on the transmission source (information processing device 3) side or on the transmission destination (sound IC 16) side.

Next, the CPU 5 transmits the virtual space image based on the virtual space image data De and the sound based on the sound data Dg to the terminal device 2 (step 98), and advances the processing operation to the next step. For example, the virtual space image based on the virtual space image data De is received by the terminal device 2 and output to the LCD 11. Thus, the virtual space image is displayed. The sound based on the sound data Dg is received by the terminal device 2 and output from the speaker 17 via the sound IC 16. When the information processing device 3 transmits the virtual space image and the sound to the terminal device 2, a prescribed compression process may be performed. In this case, data of the virtual space image and the sound data treated with the compression process are transmitted to the terminal device 2, and are treated with a prescribed decompression process by the terminal device 2. Then, the virtual space image is displayed and the sound is output.

Next, the CPU 5 increments the frame number n (step 99), and determines whether or not to finish the processing operation (step 100). A condition for finishing the processing operation may be, for example, that reproduction of an image of the final frame of the panorama moving image which is provided for reproduction is finished, that the user makes an operation of finishing the processing operation, or the like. When the processing operation is determined not to be finished, the CPU 5 returns the processing operation to step 91 and repeats the above-described processes. When the processing operation is determined to be finished, the CPU 5 finishes the processing operation of the flowcharts. Until it is determined in step 100 that the processing operation is to be finished, the series of processes in steps 91 through 100 are performed in repetition.

[Modifications]

The example described above is merely one example, and the following structure may be used in other examples.

In the above example of the processing operation, a part the panorama image is displayed on the terminal device 2 while the sound in accordance with the display direction (display range) of the panorama image displayed on the terminal device 2 is output from the speaker 17. The information processing system 1 may have a structure of displaying the panorama image also on the monitor 4, so that the panorama moving image is reproduced and displayed on the terminal device 2 and the monitor 4 along substantially the same time axis.

In a first example, another virtual camera for displaying the panorama image on the monitor 4 (second virtual camera) is provided, and the position and the attitude of the second virtual camera are fixed to the reference position and the initial attitude described above. An image of inner surfaces of the three dimensional model as viewed from the second virtual camera is displayed on the monitor 4. Thus, the panorama image in the reference direction (front direction) can be always displayed on the monitor 4. The attitude of the second virtual camera may be changed in accordance with an operation made by the user. In this case, the range of the panorama image displayed on the monitor 4 is changed in accordance with the operation made by the user.

In a second example, an image of the entire panorama image (omnidirectional image) is always displayed on the monitor 4. For example, the omnidirectional image may be generated by synthesizing images obtained from the image-capturing camera which has captured the panorama moving image, or by synthesizing panorama images pasted on the inner surfaces of the three dimensional model. The technique for generating the omnidirectional image is well known and will not be described herein in detail.

In a third example, the panorama image displayed on the terminal device 2 is displayed on the monitor 4 as it is. In this case, the panorama image displayed on the terminal device 2 may be displayed on the monitor 4 in real time. In the case where the terminal device 2 reproduced the same panorama moving image in the past, the following panorama image among the panorama images which were displayed on the terminal device 2 during the past reproduction may be displayed on the monitor 4: a panorama image at substantially the same time axis, in the reproduction of the panorama moving image, as the panorama image displayed on the terminal device 2 at the current time.

In the first through third examples described above, the sound which is output from the monitor 4 may be a sound in accordance with the display direction (display range) of the panorama image displayed on the monitor 4, like in the case of the sound output control performed on the terminal device 2 described above. In the first through third examples described above, the sound which is output from the monitor 4 may be the entire sound obtained by mixing of all the sounds recorded during the capturing of the panorama moving image. In the latter case, the sound adjusted in accordance with the display direction (display range) of the panorama image is output from the terminal device 2, whereas the entire sound obtained by mixing of all the recorded sounds is output from the monitor 4. Therefore, the user can enjoy the sound having the sound source localized in the direction desired by the user by use of the terminal device 2 and feel as if he/she was at the site of the image. In addition, when wishing to listen to the entire sound, the user can listen to the sound output from the monitor 4. In this manner, the user can listen to different types of sounds in accordance with the preference of the user or the state of viewing the panorama moving image.

In the example described above, the information processing system 1 includes only one terminal device 2. Alternatively, the information processing system 1 may include a plurality of terminal devices 2. Namely, the information processing device 3 may be wirelessly communicable with each of the plurality of terminal devices 2, so that the information processing device 3 can transmit image data to each of the terminal devices 2 and receive data of the gyrosensor 15 from each of the terminal devices 2. A virtual camera for each terminal device 2 may be located in the virtual space, so that the information processing device 3 can control the attitude of each virtual camera in accordance with the attitude of the corresponding terminal device 2 and transmit an image of the virtual space as viewed from each virtual camera to the corresponding terminal device 2. The information processing device 3 may perform wireless communication with each terminal device 2 in a time division manner or in a frequency division manner.

For displaying a panorama moving image by use of a plurality of terminal devices 2 as described, in step 83, the virtual cameras are located at the same reference position with the same initial attitude. In steps 84 through 86, the terminal devices 2 are adjusted in terms of the attitude so as to be oriented in the same direction. When the terminal devices 2 are oriented in the same direction, a prescribed operation is made by use of at least one of the terminal devices 2. In this manner, the attitude of each terminal device 2 is set to the reference attitude. Based on such settings, the attitude of each virtual camera is changed in accordance with the rotation amount of the corresponding terminal device 2 from the reference attitude, and an image of inner surfaces of the three dimensional model as viewed from each virtual camera is displayed on the corresponding terminal device 2. Like in the case of the sound output control described above, a sound in accordance with the display direction (display range) of the panorama image displayed on each terminal device 2 is output from the speaker of the corresponding terminal device 2. In this manner, the relative positions of the terminal devices 2 in the real space are calibrated, and then the attitude of each virtual camera is changed in the same manner as the attitude of the corresponding terminal device, and also the sound in accordance with the display direction (display range) is output from each terminal device 2. Owing to this, images and sounds which might be obtained by freely peeking into, and listening to, one same world generated by the panorama moving image via a plurality of display devices are displayed on, and output from, the respective display devices 2.

The above-described terminal device 2 does not execute the series of processes described above with reference to FIGS. 14 and 15 or the information processing operation executed by the information processing device 3; namely, acts as a so-called thin client terminal. Alternatively, the terminal device 2 may have a function of executing a prescribed information processing operation (game processing operation) by a predetermined program (game program), like a mobile game device or the like. In this case, at least a part of the series of processes executed by the information processing device 3 in the above-described example may be executed by the terminal device 2. In an example, in the case where a panorama moving image is displayed on, and a corresponding sound is output from, a plurality of terminal devices including at least one terminal device which is capable of executing all of the above-described series of processes, one of the at least one terminal device is used as a main processing device for executing the series of processes. A panorama moving image and a sound in accordance with the attitude(s) of the other terminal device(s) are transmitted from the main processing device to the other terminal device(s). Thus, substantially the same panorama moving image and substantially the same sound can be displayed on, and output from, the terminal devices.

In the above example embodiment, a panorama moving image including panorama images captured by the real world image-capturing cameras moving in the real world is displayed. Alternatively, a panorama moving image including panorama images captured by a virtual camera moving in the virtual world, or a panorama moving image obtained by synthesizing a panorama image of the real world and a panorama image of the virtual world may be displayed.

In other embodiments, in an information processing system including a plurality of information processing devices communicable to each other, the information processing operation may be divided among the plurality of information processing devices so that each information processing device can execute a part assigned thereto. In the case where the plurality of information processing devices execute the information processing operation, the processes to be executed by these information processing devices are synchronized, which complicates the processing operation. By contrast, in the case where, as in the above-described example embodiment, the information processing operation is executed by one information processing device 3 and the terminal device 2 receives and displays an image (namely, in the case where the terminal device 2 is a thin client terminal), the processes are not synchronized among the plurality of information processing devices, which can simplify the processing operation.

In the above-described example embodiment, the information processing system 1 including the information processing device 3 capable of executing an information processing operation is described as one example. The processing operation described in the above example embodiment can be executed by any information processing system and any information processing device, as well as by a game system and a game device described above as an example. Any information processing system which includes an information processing device and at least one display device (e.g., terminal device 2, etc.) is usable. Any information processing device which can output an image to the display device and allow the display device to display the image is usable. The above-described processes can be executed by one processor or a cooperation of a plurality of processors included in an information processing system including at least one information processing device.

The example embodiment described above can be realized in a system form of so-called cloud computing or a distributed system form of wide area network or local area network. For example, in the distributed system form of local area network, the above-described processing operation can be executed by a cooperation of a non-portable information processing device (non-portable game device) and a mobile information processing device (mobile game device). In these system forms, there is no specific limitation regarding which of the devices is to perform which of the steps described above. Regardless of how the processing operation is divided among the devices, the example embodiment can be realized, needless to say.

The above-described information processing program may be supplied to the information processing device 3 via an external storage medium or via a wired or wireless communication circuit. The above-described program may be stored in advance on a nonvolatile storage device in the information processing device 3. Examples of the information storage medium for storing the program include CD-ROMs, DVDs, optical disc-type storage mediums similar thereto, nonvolatile memories, flexible discs, hard discs, magneto-optical discs, magnetic tapes and the like. The information storage medium storing the program may be a nonvolatile memory storing the program. Such a storage medium is considered as a storage medium readable by a computer or the like. For example, it is possible to provide the above-described various functions by causing a computer or the like to read and execute the programs stored on these storage mediums.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While some system examples, method examples, device examples, and apparatus examples have been described in detail, the foregoing description is in all aspects illustrative and not restrictive. It is to be understood that numerous other modifications and variations can be devised without departing from the spirit and scope of the appended claims. It is also to be understood that the scope of the example embodiment is indicated by the appended claims rather than by the foregoing description. It is also to be understood that the detailed description herein enables one skilled in the art to make changes coming within the meaning and equivalency range of the example embodiment. It is to be understood that as used herein, the singular forms used for elements and the like with "a" or "an" are not intended to exclude the plural forms thereof. It should be also understood that the terms as used herein have definitions typically used in the art unless otherwise mentioned. Thus, unless otherwise defined, all scientific and technical terms used herein have the same meanings as those generally used by those skilled in the art to which the example embodiment pertains. If there is contradiction, the present specification (including the definitions) precedes.

As described above, the example embodiment is usable for, for example, an information processing program, an information processing device, an information processing system, an information processing method and the like for the purpose of, for example, when a panorama moving image is displayed, giving a viewer an enhanced sense of being at the site of the image.

What is claimed is:

1. A non-transitory computer-readable storage medium storing an information processing program, the information processing program being executable by a computer included in an information processing device for displaying an image on at least one first display device including a speaker and a sound storage unit that stores a panorama moving image of a real world and stores sounds which are recorded at the time of capturing the panorama moving image by use of a plurality of directional microphones having different sound collection directions in the real world, and stores a position corresponding to each of the sound collection directions in the panorama moving image as the position of the sound source, the position being stored in correspondence with each of the sounds and a volume of the sound having the position as the sound source is adjusted based on the position of the sound source with respect to a display range of the panorama moving image, wherein the information processing program enables the computer to perform functions and operations comprising:

reading and sequentially acquiring a panorama moving image from the storage unit, wherein a panorama image which forms each frame of the panorama moving image is read and sequentially acquired from the storage unit with a cycle having a predetermined length of time;

setting a display range, defining a partial area within the acquired panorama moving image, which is to be displayed on the first display device in accordance with an operation made by a user;

generating, based on the display range, a sound to be output in synchronization with a display of a panorama moving image on the first display device;

sequentially displaying the display range of the acquired panorama moving image on the first display device; and outputting the generated sound from the speaker in synchronization with the display of the image on the first display device.

2. The non-transitory computer-readable storage medium storing the information processing program according to claim 1, wherein:

the information processing program enables the computer to further execute acquiring an original sound for generating the sound to be output in synchronization with the display of the image on the first display device, the original sound being acquired from a sound storage unit storing at least one sound recorded at the time of capturing the panorama moving image or at the time of reproducing the panorama moving image; and a volume of the acquired original sound is adjusted based on the display range to generate the sound to be output in synchronization with the display of the image on the first display device.

3. The non-transitory computer-readable storage medium storing the information processing program according to claim 2, wherein:

the sound storage unit stores a position in the panorama moving image which is a sound source of the recorded sound, the position being stored in correspondence with each or the at least one sound; and based on the position of the sound source with respect to the display range of the panorama moving image, the volume of the sound having the position as the sound source is adjusted.

4. The non-transitory computer-readable storage medium storing the information processing program according to claim 3, wherein in the case where the display range of the panorama moving image and the position of the sound source are relatively close to each other, the volume of the sound having the position as the sound source is adjusted to be relatively large.

5. The non-transitory computer-readable storage medium storing the information processing program according to claim 3, wherein in the case where the position of the sound source is within a prescribed range with respect to the display range of the panorama moving image, the volume of the sound having the position as the sound source is set to a value equal to or greater than a prescribed value, and in the case where the position of the sound source is outside the prescribed range, the volume of the sound having the position as the sound source is set to 0.

6. The non-transitory computer-readable storage medium storing the information processing program according to claim 2, wherein:

the sound storage unit stores sounds respectively recorded at a plurality of sound sources at the time of capturing the panorama moving image or at the time of reproducing the panorama moving image, and stores a position, in the panorama moving image, of each of the sound sources, the position being stored in correspondence with each of the sounds; and the sound to be output in synchronization with the display of the image on the first display device is selected based on the position of each of the sound sources with respect to the display range of the panorama moving image.

7. The non-transitory computer-readable storage medium storing the information processing program according to claim 6, wherein in the case where the display range of the panorama moving image and the position of each of the sound sources are put into a prescribed relationship, the sound having the position as the sound source is selected as the sound to be output in synchronization with the display of the image on the first display device.

8. The non-transitory computer-readable storage medium storing the information processing program according to claim 3, wherein the volume of the sound having the position as the sound source is adjusted in accordance with whether the display range of the panorama moving image encompasses the position of the sound source or not.

9. The non-transitory computer-readable storage medium storing the information processing program according to claim 8, wherein in the case where the display range of the panorama moving image encompasses the position of the sound source, the volume of the sound having the position as the sound source is adjusted to be relatively large.

10. The non-transitory computer-readable storage medium storing the information processing program according to claim 3, wherein:

as the position of the sound source in the panorama moving image, the sound storage unit stores an effective area in which the sound having the position as the sound source is an output target, the effective area being stored as being set in the panorama moving image and in correspondence with each sound source; and the volume of the sound at the sound source for which the effective area is set is adjusted in accordance with the size of the effective area encompassed in the display range of the panorama moving image.

11. The non-transitory computer-readable storage medium storing the information processing program according to claim 8, wherein:

the first display device is capable of displaying the panorama moving image as being enlarged or reduced in accordance with an operation made by the user;

the display range to be displayed on the first display device is set as being enlarged or reduced in accordance with an operation of enlarging or reducing the panorama moving image; and the volume of the sound is adjusted in accordance with the enlarged or reduced display range.

12. The non-transitory computer-readable storage medium storing the information processing program according to claim 2, wherein:

the storage unit stores a panorama moving image of a real world;

the sound storage unit stores sounds which are recorded at the time of capturing the panorama moving image by use of microphones respectively provided at a plurality of sound collection positions in the real world, and stores each of the sound collection positions in the panorama moving image as the position of the sound source, the position being stored in correspondence with each of the sounds; and the volume of the sound having the position as the sound source is adjusted based on the position of the sound source with respect to the display range of the panorama moving image.

13. The non-transitory computer-readable storage medium storing the information processing program according to claim 2, wherein:

the sound storage unit stores at least a sound recorded at the time of capturing the panorama moving image, and stores a position in the panorama moving image specified at the time of the recording as the position of the sound source, the position being stored in correspondence with each of the sounds; and the volume of the sound having the position as the sound source is adjusted based on the position of the sound source with respect to the display range of the panorama moving image.

14. The non-transitory computer-readable storage medium storing the information processing program according to claim 1, wherein:

the information processing program allows the computer to further execute locating the acquired panorama moving image in a virtual space; and a line-of-sight direction toward the panorama moving image located in the virtual space is changed to set the display range of the panorama moving image.

15. The non-transitory computer-readable storage medium storing the information processing program according to claim 1, wherein:

the information processing program allows the computer to further execute receiving an input from an input device associated to the first display device; and the display range is set based on the input received from the input device associated to the first display device.

16. The non-transitory computer-readable storage medium storing the information processing program according to claim 15, wherein:

the first display device includes a sensor for outputting data in accordance with a movement or an attitude of a main body of the first display device;

the data output from the sensor is received as an input from the input device; and the display range is set in accordance with the attitude of the first input device, which is calculated based on the data output from the sensor.

17. The non-transitory computer-readable storage medium storing the information processing program according to claim 16, wherein:

the sensor is at least one of a gyrosensor or an acceleration sensor for outputting the data in accordance with the movement or the attitude of the main body of the first display device; and the display range is set in accordance with the attitude of the first display device, which is calculated based on the data output from at least one of the gyrosensor and the acceleration sensor.

18. The non-transitory computer-readable storage medium storing the information processing program according to claim 1, wherein:

a display range which is to be displayed on a non-portable second display device is further set in the acquired panorama moving image;

a sound to be output from the second display device in synchronization with display of an image on the second display device is further generated independently from the sound generated based on the display range displayed on the first display device; and control of sequentially displaying, on the second display device, the display range of the acquired panorama moving image which is to be displayed on the second display device is further performed; and control of outputting the sound to be output from the second display device, from the second display device in synchronization with the display of the image on the second display device is further performed.

19. The non-transitory computer-readable storage medium storing the information processing program according to claim 1, wherein:

control of sequentially displaying the display range of the acquired panorama image on the first display device is performed; and control of outputting the generated sound from the speaker in synchronization with the display of the panorama image on the first display device is performed.

20. An information processing device for displaying an image on at least one display device including a speaker, the information processing device comprising:

a storage unit storing a panorama moving image of a real world and sounds which are recorded at the time of capturing the panorama moving image by use of a plurality of directional microphones having different sound collection directions in the real world, and which stores a position corresponding to each of the sound collection directions in the panorama moving image as the position of the sound source, the position being stored in correspondence with each of the sounds and a volume of the sound having the position as the sound source is adjusted based on the position of the sound source with respect to a display range of the panorama moving image;

a panorama moving image reader that reads and sequentially acquires the panorama moving image stored on the storage unit, wherein a panorama image which forms each frame of the panorama moving image is read and sequentially acquired from the storage unit with a cycle having a predetermined length of time;

a display range setter that sets a display range, defining a partial area within the acquired panorama moving image, which is to be displayed on the display device in accordance with an operation made by a user;

a sound generator that generates a sound to be output in synchronization with a display of a panorama moving image on the display device, the sound being generated based on the display range;

a display controller that sequentially displays the display range of the acquired panorama moving image on the display device; and a sound output controller that outputs the sound generated by the sound generator to the speaker in synchronization with the display of the image on the display device.

21. An information processing system, including a plurality of devices communicable to each other, for displaying an image on at least one display device including a speaker, the information processing system comprising:

a storage unit storing a panorama moving image of a real world and sounds which are recorded at the time of capturing the panorama moving image by use of a plurality of directional microphones having different sound collection directions in the real world, and which stores a position corresponding to each of the sound collection directions in the panorama moving image as the position of the sound source, the position being stored in correspondence with each of the sounds and a volume of the sound having the position as the sound source is adjusted based on the position of the sound source with respect to a display range of the panorama moving image;

a panorama moving image reader that reads and sequentially acquires the panorama moving image stored on the storage unit, wherein a panorama image which forms each frame of the panorama moving image is read and sequentially acquired from the storage unit with a cycle having a predetermined length of time;

a display range setter that sets a display range, defining a partial area within the acquired panorama moving image, which is to be displayed on the display device in accordance with an operation made by a user;

a sound generator that generates a sound to be output in synchronization with a display of a panorama moving image on the display device, the sound being generated based on the display range;

a display controller that sequentially displays the display range of the acquired panorama moving image on the display device; and a sound output controller that outputs the sound generated by the sound generator to the speaker in synchronization with the display of the image on the display device.

22. An information processing method executable by one processor or by a cooperation of a plurality of processors included in an information processing system which includes at least one information processing device for displaying an image on at least one display device including a speaker and a sound storage unit that stores a panorama moving image of a real world and stores sounds which are recorded at the time of capturing the panorama moving image by use of a plurality of directional microphones having different sound collection directions in the real world, and stores a position corresponding to each of the sound collection directions in the panorama moving image as the position of the sound source, the position being stored in correspondence with each of the sounds and a volume of the sound having the position as the sound source is adjusted based on the position of the sound source with respect to a display range of the panorama moving image, the information processing method comprising:

reading and sequentially acquiring a panorama moving image from the storage unit, wherein a panorama image which forms each frame of the panorama moving image is read and sequentially acquired from the storage unit with a cycle having a predetermined length of time;

setting a display range, defining a partial area within the acquired panorama moving image, which is to be displayed on the first display device in accordance with an operation made by a user;

generating, based on the display range, a sound to be output in synchronization with a display of a panorama moving image on the first display device;

sequentially displaying the display range of the acquired panorama moving image on the display device; and outputting the generated sound from the speaker in synchronization with the display of the image on the display device.

* * * * *